(12) United States Patent
Maldonado-Rueda

(10) Patent No.: US 10,924,597 B1
(45) Date of Patent: Feb. 16, 2021

(54) HAND-SUPPORTABLE MOBILE DEVICE RETENTION APPARATUS

(71) Applicant: Jose Andres Maldonado-Rueda, Miami, FL (US)

(72) Inventor: Jose Andres Maldonado-Rueda, Miami, FL (US)

( * ) Notice: Subject to any disclaimer, the term of this patent is extended or adjusted under 35 U.S.C. 154(b) by 0 days.

(21) Appl. No.: 16/847,579

(22) Filed: Apr. 13, 2020

Related U.S. Application Data

(63) Continuation-in-part of application No. 15/985,083, filed on May 21, 2018, now abandoned.

(51) Int. Cl.
*A45F 5/00* (2006.01)
*H04M 1/04* (2006.01)
*F16M 13/00* (2006.01)

(52) U.S. Cl.
CPC ............ *H04M 1/04* (2013.01); *F16M 13/005* (2013.01); *A45F 2200/0516* (2013.01)

(58) Field of Classification Search
CPC ............ H04B 2001/3861; B43L 15/00; Y10S 224/93; H04M 1/04; A45F 5/00; A45F 2200/0516; A45F 2005/008; A45F 2200/0525; A45F 5/10; Y10T 24/13; F16M 13/04
USPC ................................................ 224/930, 217
See application file for complete search history.

(56) References Cited

U.S. PATENT DOCUMENTS

| | | | | |
|---|---|---|---|---|
| 2,202,957 | A * | 6/1940 | Martin | B43L 15/00 401/8 |
| 5,327,918 | A * | 7/1994 | Stewart | A45D 29/22 128/879 |
| 7,942,293 | B2 * | 5/2011 | Lawrence | A45C 11/008 224/197 |
| 8,746,448 | B1 * | 6/2014 | Bellace | A45F 5/00 206/320 |
| 9,344,135 | B2 * | 5/2016 | Fiorentino | H04B 1/3877 |
| 10,278,299 | B2 * | 4/2019 | Kim | E05D 3/022 |
| 10,342,323 | B2 * | 7/2019 | Forutanpour | A45F 5/10 |
| 2006/0152345 | A1 * | 7/2006 | Aitkenhead | C09J 7/38 340/384.1 |
| 2008/0021334 | A1 * | 1/2008 | Finburgh | A61B 5/6833 600/490 |
| 2010/0264182 | A1 * | 10/2010 | Perlman | H04M 1/04 224/409 |
| 2014/0285968 | A1 * | 9/2014 | Budge | F16M 13/00 361/679.56 |

* cited by examiner

*Primary Examiner* — Adam J Waggenspack
(74) *Attorney, Agent, or Firm* — Glenn E. Gold, P.A.; Glenn E. Gold

(57) ABSTRACT

An attachment aid for securing a mobile device to a finger of a human hand in a manner enabling a user to manipulate the position and orientation of a secured mobile device vis-à-vis the human hand between an in-use state and a non-use state includes a mobile device-retaining portion at one end and a user finger-retaining portion at an opposite end.

9 Claims, 19 Drawing Sheets

HAND-SUPPORTABLE MOBILE DEVICE RETENTION APPARATUS

CROSS REFERENCE TO RELATED APPLICATIONS

This U.S. non-provisional patent application is a continuation-in-part of co-pending U.S. patent application Ser. No. 15/985,083, having a filing date of May 21, 2018, the entire contents of which is incorporated by reference herein in its entirety.

FIELD OF THE INVENTION

The present invention pertains generally to the securement of a mobile device to the hand of an individual; and, more particularly, to attachment aids for securing a mobile device to a finger of an individual's hand in a manner enabling a user to selectively rotate the mobile device, about the finger, into a position and orientation facilitating interaction of a device touch screen using opposing thumbs of the individual's right and left hands.

BACKGROUND OF THE INVENTION

Smart phones, tablets and other mobile devices have become omnipresent indispensable devices in frequent use throughout a user's day. They are so costly, and of such importance, that owners dread dropping such devices and breaking them during tactile interaction with a device touch screen.

Attachment aids are known for assisting with the temporary attachment of a mobile device to an individual user's hand to prevent such accidental dropping and breakage. For example, attachment aids in the form of a band secured to a rear (non-display) side of a mobile device, and through which a user's entire hand may be inserted during use of the attachment aid, are known. Other attachment aids in the form of a glove and the like, secured to the rear side of a mobile device and into which some or all of a user's hand must be inserted, are known. Likewise, attachment aids in the form of one or more rings secured to a rear side of a mobile device, and through which a user's corresponding finger(s) may be inserted during use of the attachment aid, are known. Furthermore, attachment aids in the form of, for example, a glove having attachment structure on the dorsal side (i.e. the glove portion covering the back of the hand opposite the palm side) of the glove, which may be donned by a user and which incorporate means for enabling selective attachment of a mobile device thereto are known.

Some such attachment aids even incorporate means for enabling limited manipulation of an attached mobile device. For instance, some such attachment aids enable rotation or other limited repositioning of the attached mobile device by a user. However, these and other previously-proposed attachment aids typically do not enable a user to easily manipulate the position and/or orientation of an attached mobile device between an "in-use" position/orientation (i.e. when the mobile device owner is actually viewing and interacting with, for instance, the mobile device's touchscreen display) and a "not-in-use" position/orientation (i.e. when the mobile device owner is not viewing or otherwise interacting with the mobile device). Furthermore, previously proposed attachment aids typically do not enable quick and accurate mobile device repositioning from an in-use position/orientation, relative to the corresponding position/orientation of a user's hand, to a not-in-use position enabling the user to regain substantially full use of the attachment aid donning hand, while maintaining the mobile device securely against the hand (e.g. supported against the back side of the hand).

Accordingly, there is a need for an improved mobile device attachment aid, or apparatus, enabling a mobile device owner to releasably secure a mobile device to the hand, which overcomes the limitations, drawbacks, and disadvantages associated with known attachment aids. In particular, it would be highly desirable to provide such an attachment apparatus that is releasably-attachable to a finger of a human hand in a manner facilitating manipulation of the temporarily secured mobile device between a first position—in which the mobile device is particularly oriented to facilitate use of the mobile device, and particularly manipulation of mobile device features such as a touchscreen-type display—and a second position, in which the mobile device is temporarily positioned and oriented to enable the user to have virtually complete use of the hand, while maintaining the mobile device in a secure position against, for example, the dorsal, or back, side of the hand. It would be even more beneficial to provide such an apparatus incorporating means for enabling a user to rotate the mobile device about the finger, not just between a single in-use position and a single non-use position, but between a series of user-selectable predefined orientations to enable even greater user flexibility (i.e. fine-tuning) with regard to the precise repositioning of the mobile device vis-à-vis the user's hand.

It would be even more desirable to provide such an apparatus incorporating a universal finger attachment portion that not only enables comfortable attachment of the apparatus to a wide range of human finger sizes when the apparatus is used to attach a mobile device to a human hand, but which incorporates a more universal type attachment structure making the apparatus equally useful for temporary secure attachment of a mobile device to a structure, such as the edge of a table, a pipe, and the like.

SUMMARY OF THE INVENTION

The present disclosure is generally directed to finger-supportable mobile device retention apparatus for enabling a user to efficiently and effectively secure a personal mobile device to a user's finger—particularly a user's pinky finger—in such a manner that the mobile device is not only secured to the finger, and thus the hand, of the user to prevent accidental dropping of the mobile device, but also enables the user to easily manipulate the position/orientation of the phone with respect to the user's hand—via rotation about the user's finger—between a not-in-use, or non-use, position/orientation and an in-use position/orientation.

In the broadest terms, the invention provides an apparatus to which an individual user may selectively and releasably secure a portable mobile device, such as a conventional portable smart phone, and which incorporates a finger receiving/engaging portion to enable the user to rotate the apparatus (and thus, the attached mobile device) about the user's finger between a non-use position and orientation wherein the user's hands are substantially free, and an in-use position and orientation wherein the user can easily interact tactically with the device's touch screen using opposing thumbs of the user's left and right hands.

In accordance with a general implementation, the finger-supportable mobile device retention apparatus includes: (a) a mobile device retention portion; and (b) a finger-receiving portion, the mobile device retention portion and the finger-receiving portion comprising a unitary structure, wherein the unitary structure precludes positional displacement of the mobile device retention portion and the finger-receiving portion with respect to one another while enabling selective rotation of the apparatus about a user's finger between an in-use position/orientation and a non-use (i.e., not-in-use) position/orientation.

In some implementations, the finger-receiving portion may define a finger-receiving channel having a central axis extending in a direction parallel to the plane of the mobile device retention portion (and thus, the plane of the mobile device touchscreen display).

In some implementations, the finger-receiving portion may further comprise a finger-receiving cradle adjoined to a proximal, lower end of the mobile device retention portion in a manner precluding any positional displacement of the finger-receiving cradle vis-à-vis the mobile device retention portion. For example, the finger-receiving cradle may comprise a semi-cylindrical body defining a concave interior surface sized and shaped to conform to a human finger, and an opposite convex exterior surface, the semi-cylindrical body having a pair of strap-receiving slots provided therethrough and each having a longitudinal axis oriented parallel to the central axis of the finger-receiving cradle channel.

In some implementations, the apparatus may further comprise a strap having a strap length extending between a thickened, fixed strap end and an opposite free strap end, the fixed strap end having an adequate thickness to prevent the fixed strap end from being pulled through either of the pair of strap-receiving slots of the finger-receiving cradle. In this manner, the strap length may be pulled through the pair of straps to create a strap loop that can be tightened to tightly secure the user's finger against the concave interior surface of the semi-cylindrical body. The strap may incorporate auxiliary components or features to enable the free end of the strap length to be folded back upon an intermediate length of the strap and fixed in place. For example, the strap may include a first half of a hook-and-loop system disposed upon an exterior strap surface proximate to the free strap end, and a second half of a hook-and-loop system disposed upon the exterior strap surface a distance from the first half of the hook-and-loop system, wherein the free end of the strap length may be threaded through a first one of the pair of strap-receiving slots, around a finger seated within the finger cradle, through a second one of the pair of strap-receiving slots, and subsequently folded back on itself, tightened, and secured via the first and second halves of the hook-and-loop system to tightly secure the finger within the finger-receiving cradle channel.

In some implementations, the mobile device retention portion may further comprise: (a) a support panel having a contiguous perimeter edge separating a planar front surface and an opposite rear surface; and (b) a gel pad disposed upon an area of the planar front surface of the support panel, the gel pad having a permanently tacky exposed planar front surface, wherein the tackiness of the exposed planar front surface of the gel pad creates an adhesive force, between the planar front surface of the gel pad and a planar rear surface of a supported mobile device, sufficient to maintain adhesion of the rear surface of the mobile device to the front surface of the gel pad regardless of the orientation of the finger-supportable apparatus.

In some implementations, the mobile device retention portion may further comprise: (a) a support panel having a contiguous perimeter edge separating a planar front surface and an opposite rear surface; and a gel pad disposed upon an area of the planar front surface of the support panel, the gel pad having a permanently tacky exposed planar front surface, wherein the tackiness of the exposed planar front surface of the gel pad creates an adhesive force, between the planar front surface of the gel pad and a planar rear surface of a supported mobile device, sufficient to maintain adhesion of the rear surface of the mobile device to the front surface of the gel pad regardless of the orientation of the finger-supportable apparatus.

In some implementations, the support panel may further comprise a plurality of spaced-apart mobile device support clips located about the contiguous perimeter edge of the support panel, wherein the support clips are configured to engage a perimeter portion of a supported mobile device to complement support provided by the adhesive force between the gel pad front surface and the rear surface of the supported mobile device.

In some implementations, the gel pad may further comprise a polyurethane gel.

In some implementations, the finger-receiving portion may comprises: (a) a semi-cylindrical body defining a finger-engaging channel having a central axis running parallel to a plane of the support panel planar front surface, the finger-receiving portion and the support panel comprising a unitary structure, wherein the position and orientation of the finger-receiving portion is permanently fixed with respect to the corresponding position and orientation of the support panel; and (b) a polyurethane gel pad disposed upon an area of the support panel planar front surface.

In some implementations, the adjustable strap length may be attached to the semi-cylindrical body of the finger-receiving portion in a manner enabling attachment of the semi-cylindrical body to a finger of an individual user, wherein, upon adhering a rear surface of the mobile device to the exposed surface of the gel pad, and attaching the finger-supportable apparatus to a finger of an individual, the finger-supportable apparatus may be rotated about a longitudinal axis of the individual's finger between an in-use orientation, wherein the rear side of the mobile device is supported by the fingers of the individual enabling the individual to comfortably interact with a mobile device touch screen display using opposing thumbs of right and left hands of the individual, and a non-use orientation wherein the finger-supported apparatus and corresponding retained mobile device are rotated about the individual's finger to free up left and right hands of the individual for other uses.

In accordance with a further exemplary implementation, the apparatus may comprise: (a) a main body having a human finger-engaging portion at a proximal portion of the main body; and (b) a mobile device-retaining portion at a distal portion thereof, wherein the finger-engaging portion in the form of a linear channel extending in a first direction, the linear channel sized, shaped, and otherwise configured for having a human finger snugly inserted therein, and wherein the mobile device-retaining portion further provided in the form of a slot sized, shaped, and otherwise configured for snugly engaging a peripheral portion of a mobile device inserted therein in a second direction that is angularly-offset 90° from the first direction (i.e. of the linear finger-engaging channel, and thus, the inserted finger when donned).

In some implementations, the finger-engaging portion may include: (a) an upper finger-engaging portion; and (b) a lower finger-engaging portion, wherein the upper and lower finger-engaging portions contiguous along a distal side of the finger-engaging portion, and spaced-apart from each other at a respective proximal side of the finger-engaging portion, thereby defining a contiguous C-shaped finger-receiving channel.

In some implementations, the finger-engaging portion may include a finger-receiving channel surface defining the C-shaped finger-receiving channel, wherein: (a) the upper finger-engaging portion is cantilevered at the distal side of the finger-engaging portion, and is downwardly-biased at the respective proximal side of the finger-engaging portion; and (b) the lower finger-engaging portion is cantilevered at the distal side of the finger-engaging portion and upwardly-biased at a proximal side of the finger-engaging portion, such that opposing forces of the downwardly-biased upper finger-engaging portion and the upwardly-biased lower finger-engaging portion create snug frictional engagement of the C-shaped finger-receiving channel surface against an inserted finger of a user of the apparatus.

In some implementations, the finger-engaging portion may be provided in the form of a C-shaped, spring-loaded compression member encapsulated within the main body, wherein the C-shaped spring-loaded compression member is slightly inset from the C-shaped finger-receiving channel surface. For example, the C-shaped, spring-loaded compression member may be provided in the form of a metal tube clamp completely encapsulated within a main body resilient mold material.

In some implementations, the mobile device retaining slot may further include: (a) a lower device-supporting portion having an upper surface; and (b) an upper device-supporting portion having a lower surface, wherein the upper surface of the lower device-supporting portion and the lower surface of the upper device-supporting portion oppose each other and are adjoined at respective proximal ends thereof by a main body structure having a vertically-oriented exterior wall surface, and wherein the lower surface of the upper device-supporting portion, a proximal area of the upper surface of the lower device-supporting portion, and the vertically-oriented exterior wall surface of the adjoining main body structure, together, define the mobile device retaining slot.

In some implementations, the upper device-supporting portion may extend outwardly a shorter distance than the lower device supporting portion, since the lower supporting portion requires a larger area to support the bottom of the mobile device. Furthermore, the upper portion may extend outwardly just enough of a distance to securely frictionally engage a peripheral portion of the upper side of the mobile device without covering a viewable portion of the mobile device display, nor impeding the user from tactile interaction with the mobile device display (or other mobile device features capable of being manipulated).

In some implementations, the upper surface of the lower device-supporting portion and the lower surface of the upper device-supporting portion may be frictionally enhanced, for example, by incorporating non-smooth surface contour features (e.g. ribbing) and/or a layer of a friction-enhancing composition disposed upon the aforementioned surfaces.

In some implementations, the finger-receiving channel may be provided in the form of an O-shaped linear channel, for example, to provide even more secure attachment of the mobile device to the user's finger.

In some implementations, a compression sleeve-type member may be provided snugly, or frictionally, fitted within either the O-shaped linear channel or the C-shaped linear channel. The compression sleeve-type member may be provided in the form of a contiguous tube (e.g. when used with an O-shaped linear channel) or in the form of a split tube (e.g. when used with a C-shaped linear channel). For example, the compression sleeve member may be provided having a comfortable, resilient composition such as a silicone gel. Alternatively, a compression sleeve-type fit may be provided in the form of a surface treatment such as a layer of, for example, silicone gel, disposed upon an exposed channel surface.

In accordance with another exemplary implementation, a hand-supportable mobile device retaining apparatus may be provided, comprising:

(a) a human finger retention body, including:
a finger-engaging portion in the form of a channel extending linearly in a first direction, the linear finger-engaging channel sized, shaped, and otherwise configured for having a human finger snugly inserted therein along this first direction; and a first pair of attachment features located at corresponding first and second ends of the finger retention body; and (b) a mobile device retention body, including:
a mobile device-engaging portion in the form of a slot sized, shaped, and otherwise configured for frictionally engaging a peripheral portion of a mobile device inserted therein in a second direction angularly-offset 90° from, or perpendicular to, the first direction; and a finger retention body attachment portion having a second pair of attachment features located at opposite first and second ends thereof, the second pair of attachment features cooperating with the first pair of attachment features to enable angular rotation of the mobile device retention body about the human finger retention body.

In some implementations, the first pair of attachment features of the human finger engaging body may cooperate with the second pair of attachment features of the mobile device retention body to enable angular rotation of the mobile device retention body about the human finger retention body to one of a series, or plurality, of user-selectable fixed angular offset positions.

In some implementations, the main body (e.g., the mobile device retention body) of the apparatus may be created having any of a variety of user-desired shapes such as, for example, shapes representing an animal or mammal (e.g., a school or team mascot, etc.), and shapes representing a sports-related object (e.g., a football, a soccer ball, a tennis racquet, etc.), and the like.

In some implementations, a layer or coating of, for example, silicone gel may be provided as the surface of the finger-receiving channel to provide comfort to a user's finger while donning the apparatus.

In some implementations, upper and lower edges of the C-shaped finger-receiving portion may be provided having a friction-enhancing composition, a friction-enhancing edge profile (e.g. a saw-toothed edge profile), and the like, for enabling the secure attachment of the apparatus to an object (e.g., a peripheral portion of a vehicle sun visor)—as opposed to a human finger. Furthermore, such friction enhancement may be provided in the form of a separate edging disposed over the upper and lower edges of the C-shaped finger-receiving portion.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF EXEMPLARY IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As is described in further detail below, the present invention is generally directed to a hand-supportable mobile device retaining apparatus having a portion configured for snugly receiving a finger of a user therein, and having an opposite portion configured for snugly receiving a peripheral edge portion of a mobile device therein, such that a user of the apparatus is able to controllably rotate the apparatus (and thus the retained mobile device) about the user's finger. In this manner, the apparatus enables a user to selectively angularly rotate the mobile device between a first angular orientation when the retained device is being used and a second angular orientation (e.g. against the back of a user's hand) when the retained device is not being used, thereby effectively freeing up the palm side of a user's hand as well as the fingers of the user's hand. In accordance with an alternative exemplary implementation, the hand supportable mobile device retaining apparatus may incorporate structural features enabling a user to angularly rotate a retained mobile device into a plurality of fixed/locked angular positions.

Figure 1:
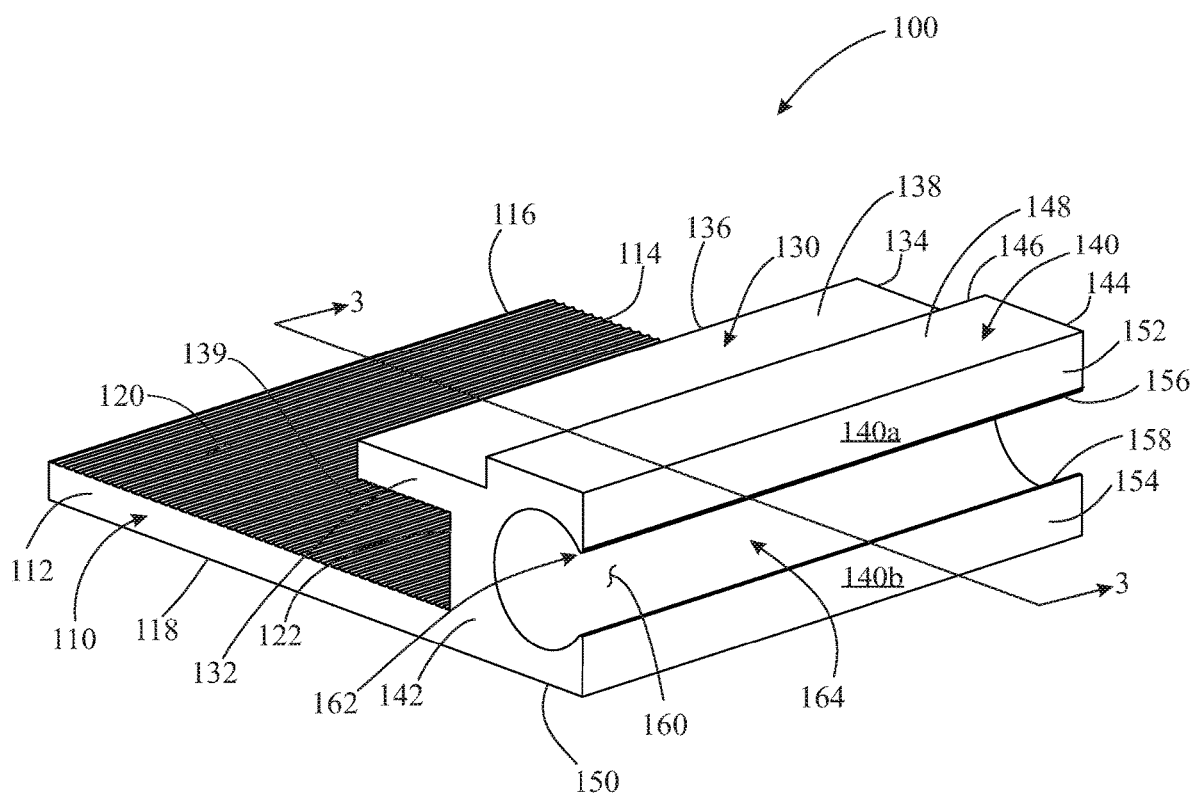
FIG. 1 is a perspective view of a hand-supportable mobile device retaining apparatus in accordance with a first exemplary implementation of the invention.
Figure 3:
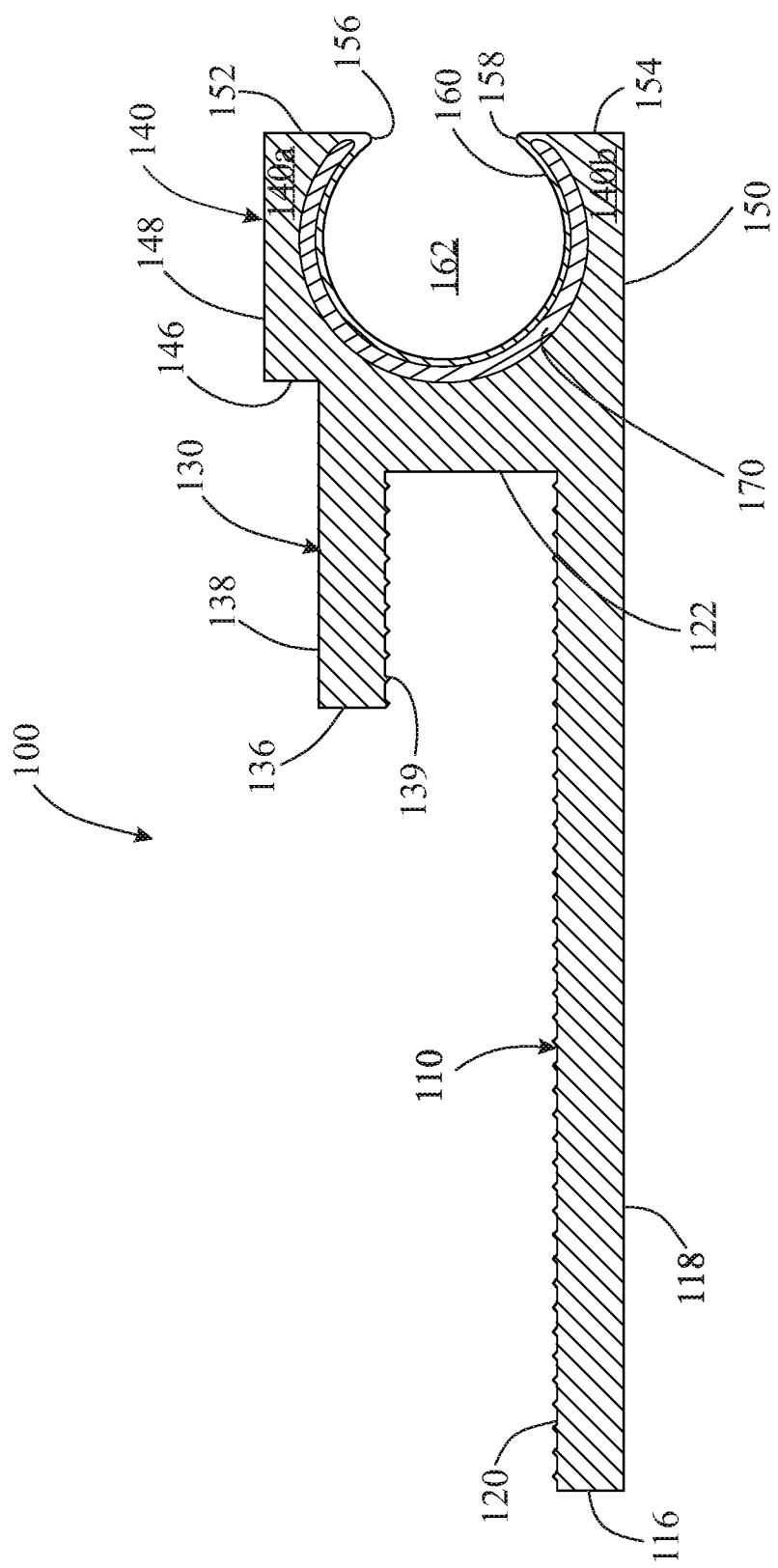
FIG. 3 is a cross-sectional view of the apparatus depicted in FIG. 1, taken along section line 3-3.
Figure 9:
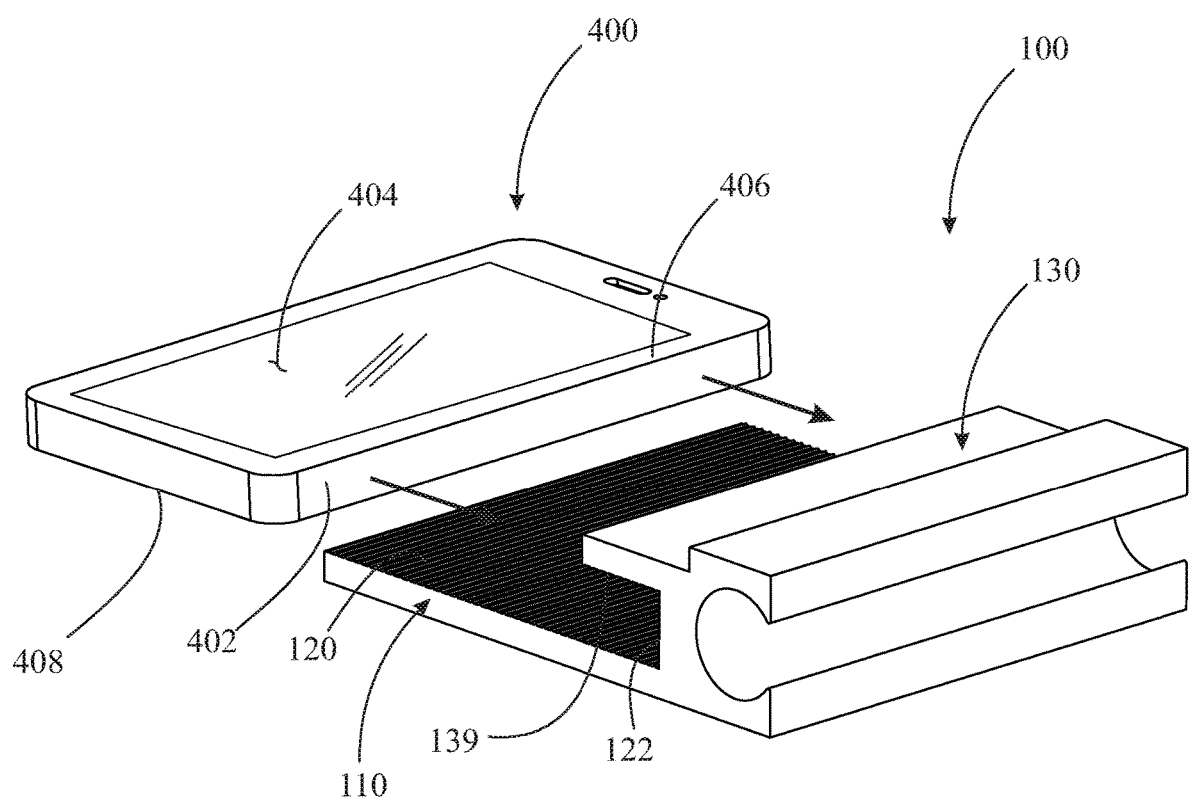
FIG. 9 is a perspective view of the first exemplary implementation of the apparatus 100 of FIG. 1, further illustrating the selective engagement a mobile device 400 therewith during use.
Figures 10, 10A:
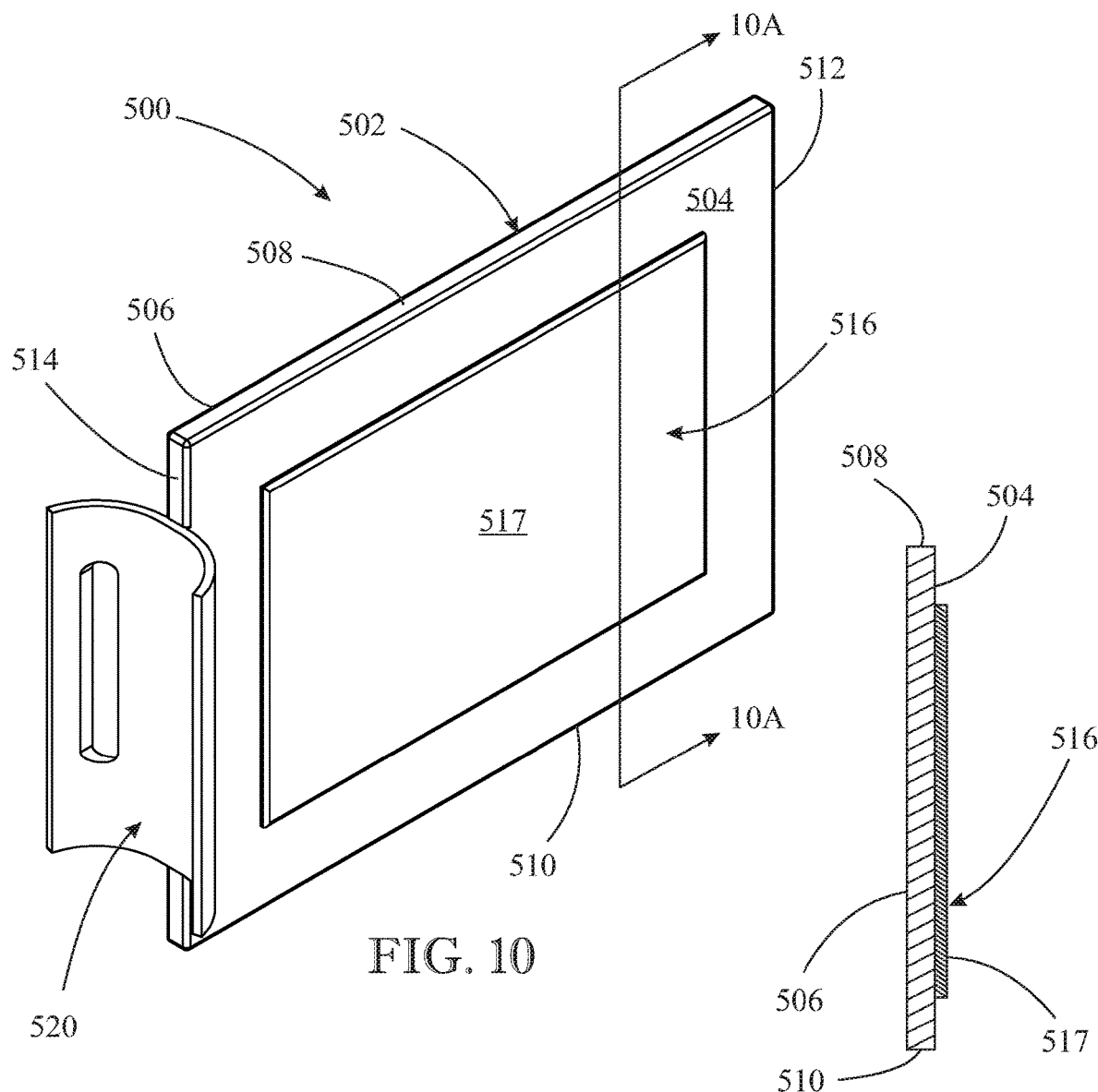
FIG. 10 is a front-left-upper perspective view of a fourth implementation of a handheld mobile device support apparatus 500 of the present invention.
FIG. 10A is a cross-sectional view taken along section line 10A-10A of FIG. 10.

Referring initially to FIGS. 1, 3 and 9, a hand-supportable mobile device retaining apparatus 100 is shown, in accordance with a first exemplary implementation of the invention. The apparatus preferably has a unitary main body comprised of a lower mobile device support portion 110, an upper mobile device support portion 130, and a finger-engaging portion 140. For the purpose of the present disclosure, use of the term "proximal end" herein is meant to refer generally to the finger-engaging portion 140 end of the main body, and the term "distal end" is meant to refer to the opposite end proximate to side 116 of lower device support portion 110.

Lower support portion 110 is generally defined by opposite first and second sides, 112 and 114, respectively, distal end side 116, bottom, or lower, surface 118, and top, or upper, surface 120. As depicted, upper surface 120 is preferably corrugated to provide enhanced friction against a bottom surface of a mobile device 400 (FIG. 9) during use of the apparatus 100 to selectively retain the mobile device. As will be apparent to those skilled in the art, it is contemplated that any of a number of alternative surface contouring configurations may be implemented, in lieu of corrugation, to achieve the preferred enhanced frictional engagement. Furthermore, applicant contemplates the use of a friction-enhancing material layer disposed upon surface 120.

Upper support portion 130 is generally defined by opposite first and second lateral sides, 132 and 134, respectively, distal end side 136, top/upper surface 138, and bottom/lower surface 139. As depicted, lower surface 139, opposing the upper surface 120 of lower device support portion 110, is also preferably corrugated to provide added friction between a peripheral top surface portion of a mobile device 400 (FIG. 9). Again, it is contemplated that any of a number of alternative surface contouring may be implemented, in lieu of corrugation, to achieve the preferred frictional engagement. Likewise, a friction-enhancing material may be disposed upon surface 139.

Preferably, the aforementioned main body is constructed from a resilient moldable elastomeric material such as, for example, natural rubber, polybutadiene and polyurethane, to name just a few. In material science, resilience is the ability of a material to absorb energy when it is deformed elastically, and release that energy upon unloading. The upper device support portion 130 and the lower device support portion 110, spaced-apart from each other by mobile device insertion limiting vertical surface 122, are constructed such that they both have a cantilevered configuration (i.e. cantilevered off of finger-engaging portion 140). Significantly, the cantilevered configuration enables flexing of lower device support portion 110 and upper device support portion 130 away from each other upon insertion of a peripheral edge portion of a mobile device 400 (FIG. 9) therebetween. In this manner, the configuration is conducive to a tight frictional fit of the aforementioned mobile device peripheral edge portion between friction-enhanced surfaces 120 and 139, upon insertion of the mobile device peripheral edge portion therebetween.

Finger-engaging, or finger-receiving, portion 140 has an upper portion 140a and a lower portion 140b, separated proximally by a proximal gap 164 of C-shaped finger-receiving channel 162, alternatively referred to herein as a finger-receiving opening. Generally, upper and lower portions, 140a and 140b, respectively, extend from a first side 142 and an opposite second side 144 of finger-receiving portion 140.

Upper portion 140a is further bounded by upper side 148, proximal side 152, and finger-engaging surface 160. As depicted, upper portion 140a may (optionally) be further bounded by a distal side 146. As shown, distal side 146 may be in the form of a step-down feature from upper surface 148 of finger engaging upper portion 140a to upper surface 138 of upper device-supporting portion 130. Such a step-down feature may result where the lower device-supporting portion 110 and the upper device-supporting portion 130 are spaced-apart a relatively short distance I the thickness of finger-engaging portion 140 required to create finger-receiving, or finger-insertion, channel 162 defined by finger-engaging surface 160. Proximal side 152 and finger-engaging surface 160 are adjoined at upper edge 156.

Lower portion 140b is further bounded by lower/bottom side 150, proximal side 154, and finger-engaging surface 160. Proximal side 154 and finger-engaging surface 160 are adjoined at a lower edge 158.

Optionally, upper and lower edges, 156 and 158, respectively, of the C-shaped finger-receiving portion may be provided having a friction-enhancing composition, a friction-enhancing edge profile (e.g. a saw-toothed edge profile), and the like, for enabling the secure attachment of the apparatus to an object (e.g., a peripheral portion of a vehicle sun visor)—as opposed to a human finger. Furthermore, such friction enhancement may be provided in the form of a separate edging layer disposed over the upper and lower edges, 156 and 158, respectively, of the C-shaped finger-receiving portion.

Figure 8:
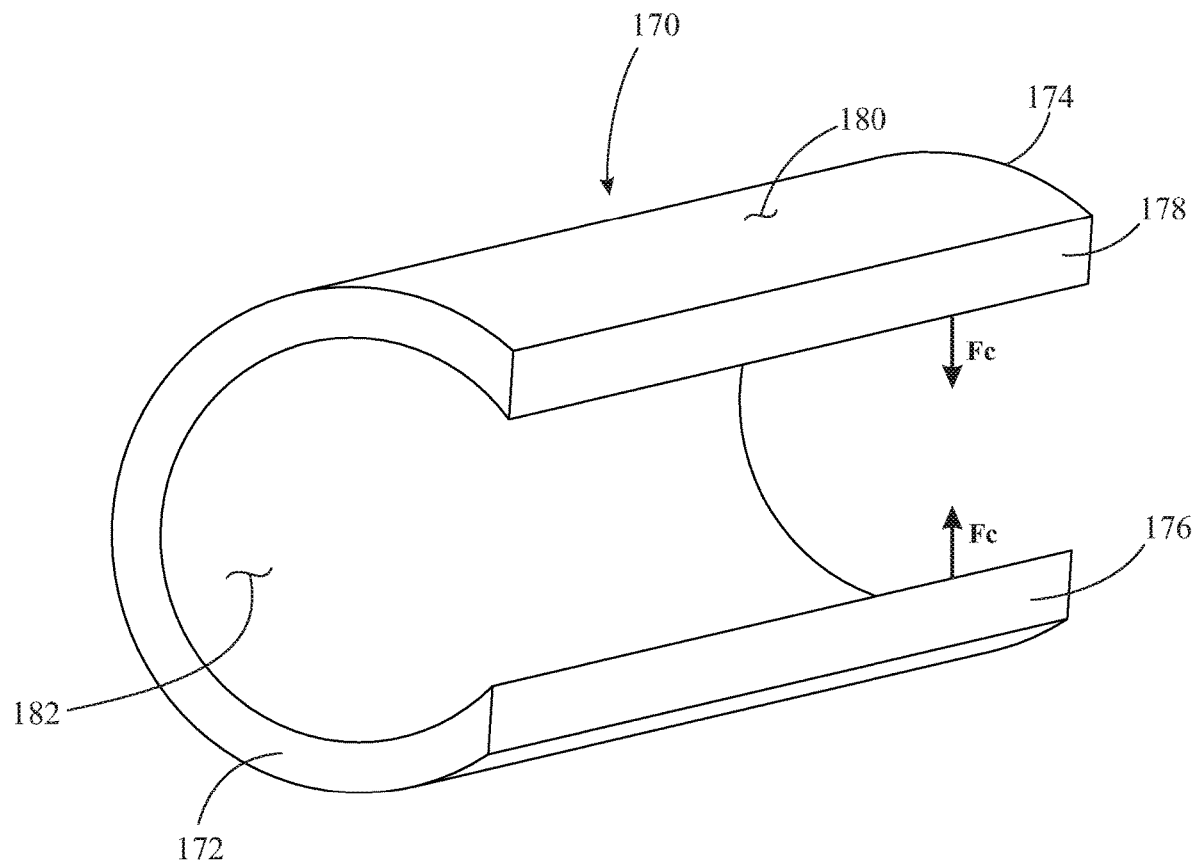
FIG. 8 is a perspective view of the C-shaped, resilient, spring-loaded, compression member 170, initially introduced in FIG. 3.

Referring briefly to FIGS. 3 and 8, a C-shaped, resilient, spring-loaded, compression member 170 may be provided encapsulated within the main body (as shown in cross-section in FIG. 3) for urging respective upper and lower portions, 140a and 140b, toward one other. In this manner, C-shaped finger-receiving channel 162 is universally adapted for receiving a wide range of user finger sizes, in light of the combination of the flexible nature of the cantilevered structures of 140a and 140b, and the internal compressive force applied by compression member 170 urging the cantilevered structures toward one another. Referring now particularly to FIG. 8, C-shaped compression member 170 is generally defined by opposite first and second lateral ends, 172 and 174, respectively; lower and upper proximal ends, 176 and 178, respectively; exterior, or outer, surface 180; and interior surface 182. As depicted by the arrows in FIG. 8, lower and upper proximal ends, 176 and 178, respectively, are biased, or urged, toward one another by the inherent compressive force, $F_C$, of compression member 170. As will be readily apparent to those skilled in the art, compression member 170 may be provided in the form of, for example, split seam compression tubing or a split seam compression sleeve. Such split compression tubes or sleeves are commercially available in a variety of metal and polymer materials. Furthermore, depending upon the mechanical characteristics of the chosen tubing material, dimension and the like, it is possible to control the resulting compressive force, $F_C$, of compression member 170.

Referring now again generally to FIGS. 1, 3, 8 and 9, finger-receiving channel 162 is further defined by channel surface 160. Optionally, surface 160 may further include a thin cushioning layer (not shown) of, for example, a silicone gel material or the like, for aiding user comfort during use. Furthermore, in a preferred implementation of the invention, an upper friction-enhancing edging 156 is provided separating upper portion front side 152 and finger-receiving channel surface 160, and a lower friction-enhancing edging 158 is provided separating lower portion front side 154 and finger-receiving channel surface 160. The upper and lower friction-enhancing edging, 156 and 158, respectively, are provided for enhancing attachment of the apparatus 100 to an object other than a finger. For example, applicant contemplates use of the apparatus 100 for hanging a mobile device from a sun visor in a motor vehicle. In that case, the C-shaped compression member 170 further functions to urge, or force, upper and lower friction-enhancing edging, 156 and 158, toward one another to effectively clamp the apparatus 100 to an edge portion of the sun visor. In that manner, the apparatus 100 can be used to hang a mobile device from the visor for hands-free viewing by a vehicle driver or passenger.

Figure 4:
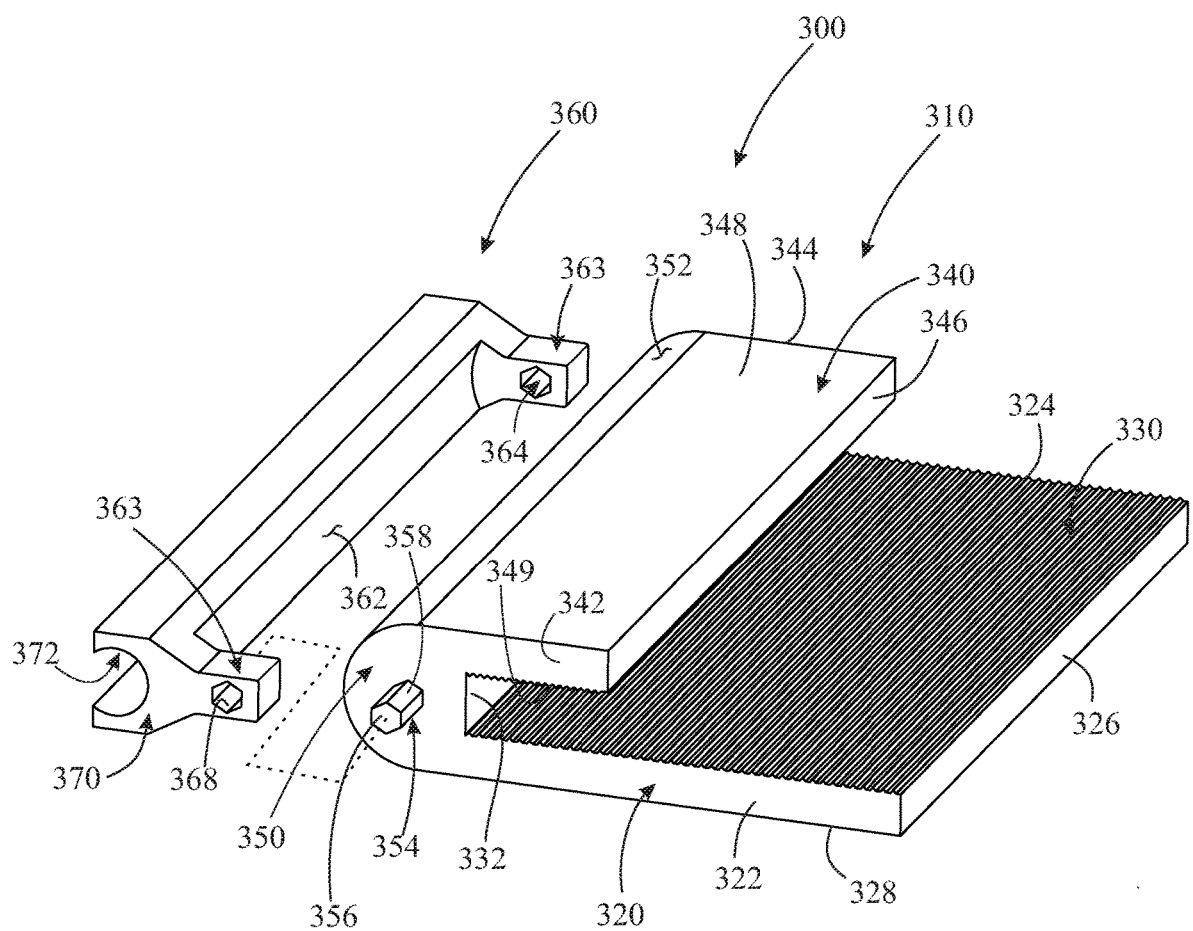
FIG. 4 is an exploded perspective view of a two-piece hand-supportable mobile device retaining apparatus in accordance with a third exemplary implementation of the invention.

Referring now briefly to FIG. 9, during use of the apparatus of the present invention, a mobile device 400 may be slidably inserted (in the direction of the arrows) into the mobile device retaining slot (previously described in great detail above) until the leading edge side 402 of the mobile device 400 abuts up against vertical wall surface 122, such that the mobile device 400 is securely frictionally retained therein by the frictional force of lower surface 139 of upper device-supporting portion 130 against mobile device upper peripheral edge portion 406, in combination with the frictional force of upper surface 120 of lower device-supporting portion 110 against a lower surface 408 of the mobile device. Although FIG. 9 illustrates this mobile device insertion process using the exemplary apparatus initially introduced in FIG. 1, it will be apparent that the same insertion process holds true for the exemplary apparatus 200 introduced in FIG. 2 (described in further detail below) and the exemplary apparatus 300 introduced in FIG. 4 (described in further detail below).

Figure 2:
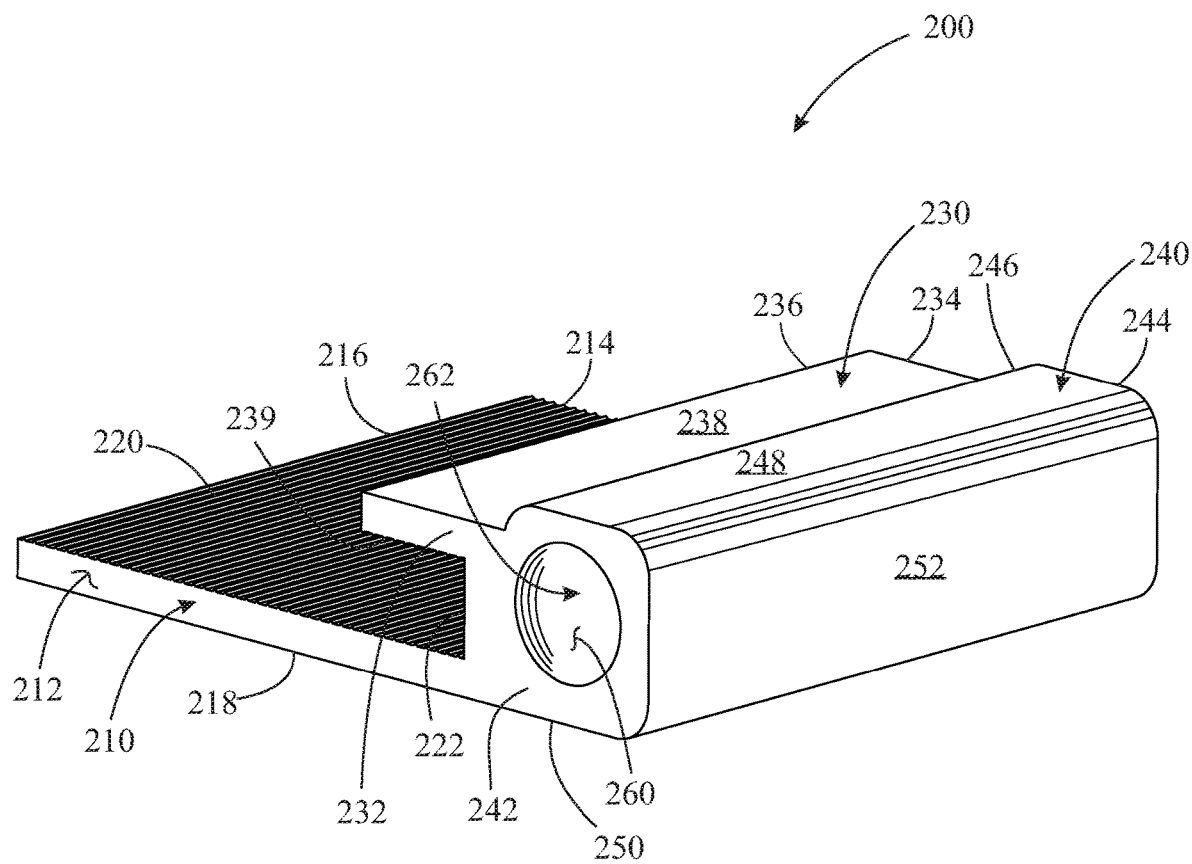
FIG. 2 is a perspective view of a hand-supportable mobile device retaining apparatus in accordance with a second exemplary implementation of the invention.

Referring now primarily to FIG. 2, in accordance with an alternative exemplary implementation, a hand-supportable mobile device retaining apparatus, shown generally as reference numeral 200, is provided having a structure substantially similar to that described in accordance with the hand-supportable mobile device-retaining apparatus 100 of FIG. 1, with a primary distinction that apparatus 200 incorporates an O-shaped finger-receiving linear channel 262 in lieu of the C-shaped finger-receiving channel 162. Initially, it should be noted that elements/features 210, 212, 214, 216, 218, 220, 222, 230, 232, 234, 236, 238, 239 and 246, depicted in FIG. 2 corresponding directly to respective elements/features 110, 112, 114, 116, 118, 120, 122, 130, 132, 134, 136, 138, 139 and 146, depicted in FIG. 2. Accordingly, further description of these elements/features is identical to the description provided hereinabove with regard to apparatus 100.

Apparatus 200 further includes finger-engaging portion 240 having an O-shaped linear channel 262 defined by contiguous o-shaped interior channel surface 260. Finger-engaging portion 240 is further defined by first lateral side 242, opposite second lateral side 244, upper side 248, lower side 250 and proximal side 252. Significantly, apparatus 200 does not incorporate an internal (i.e. encapsulated) compression member tantamount to the compression member 170 of apparatus 100. Although not shown in the accompanying figures, applicant contemplates that an O-shaped compressive tubing, or compressive sleeve, element may be provided inserted within finger-receiving channel 262 such that the compression tubing/sleeve is snugly received within the finger-receiving channel.

Referring now primarily to FIGS. 4-7, a hand-supportable mobile device retaining apparatus 300 is shown, in accordance with a third exemplary implementation of the invention. Generally, the apparatus has a mobile device-retaining component 310 releasably attachable to a finger-retaining component 360. A significant feature of this exemplary implementation is that, during use, it enables a user to selectively angularly rotate the mobile device-retaining component 310 about the finger-retaining component 360, to a user-desired angular orientation and subsequently maintain the mobile device-engaging component at the desired angular orientation—thereby maintaining a mobile device (not shown) at a user-desired angle.

The mobile device-retaining component 310 has a structure that is similar in construction to the mobile device-engaging components 110, 210 of the prior exemplary implementation. Mobile device-retaining component 310 is generally defined by a lower mobile device-supporting portion 320, an upper mobile device-supporting portion 340 spaced-apart therefrom, and an adjoining thickened proximal end portion 350.

Lower mobile device-supporting portion 320 is further defined by a first lateral side 322, and opposite second lateral side 324, a distal end side 326, a lower surface 328, and an upper mobile device-supporting surface 330.

Upper mobile device-supporting portion 340 is further defined by a first lateral side 342, an opposite second lateral side 344, a distal end side 346, an upper surface 348, and an opposite lower mobile device-engaging surface 349.

Upper surface 348 is adjoined to lower surface 328 via rounded thickened portion convex exterior surface 352. Lower mobile device-engaging surface 349 and upper device support surface 330 are adjoined by vertical device insertion-limiting surface 332. Together, lower surface 349, upper surface 330, and adjoining vertical surface 332 form a slot sized, shaped, and otherwise configured for snugly receiving a peripheral edge portion of a mobile device (not shown) being inserted into device-retaining component 310. A pair of protrusions 354 may be provided extending outwardly from opposite sides of thickened proximal end portion 350, each protrusion 354 having a series of flats 358 and an end 356. As described further below, the protrusions are sized, shaped, and otherwise configured for engagement with a complementary structure of finger-retaining component 360.

Finger-retaining component 360 is preferably comprised of a unitary body incorporating a finger-engaging portion 370 on a proximal side thereof, in the form of a finger-receiving channel 372. Finger-engaging portion 370, defining finger-receiving channel 372, may have a structure substantially similar to finger engaging portions 140 and 240, defining corresponding finger-receiving channels 162 and 262, of apparatus 100 and 200, respectively.

A pair of identical, spaced-apart, tangs 363 is provided extending distally away from finger-retaining component 360, with each one of the pair of tangs extending from opposite ends thereof. Each tang 363 is provided having an aperture 364 extending therethrough. Preferably, each aperture is defined by a contiguous series of flats 368 corresponding to the respective series of flats 358 on the exterior surface of protrusions 354. As depicted by the dotted arrowed line in FIG. 4, during assembly of the finger-retaining component 360 to the device-retaining component 310, the opposing protrusions 354, or nubs, are inserted through the corresponding apertures 364 extending through tangs 363. Along its most distal side, finger-retaining component 360 has a concave surface 362 conforming to smooth rounded exterior convex surface 352 of thickened proximal end portion 350 of device-engaging component 310. This enables rotation of device-retaining component 310 about finger-retaining component 360 in an unimpeded manner.

Figure 5:
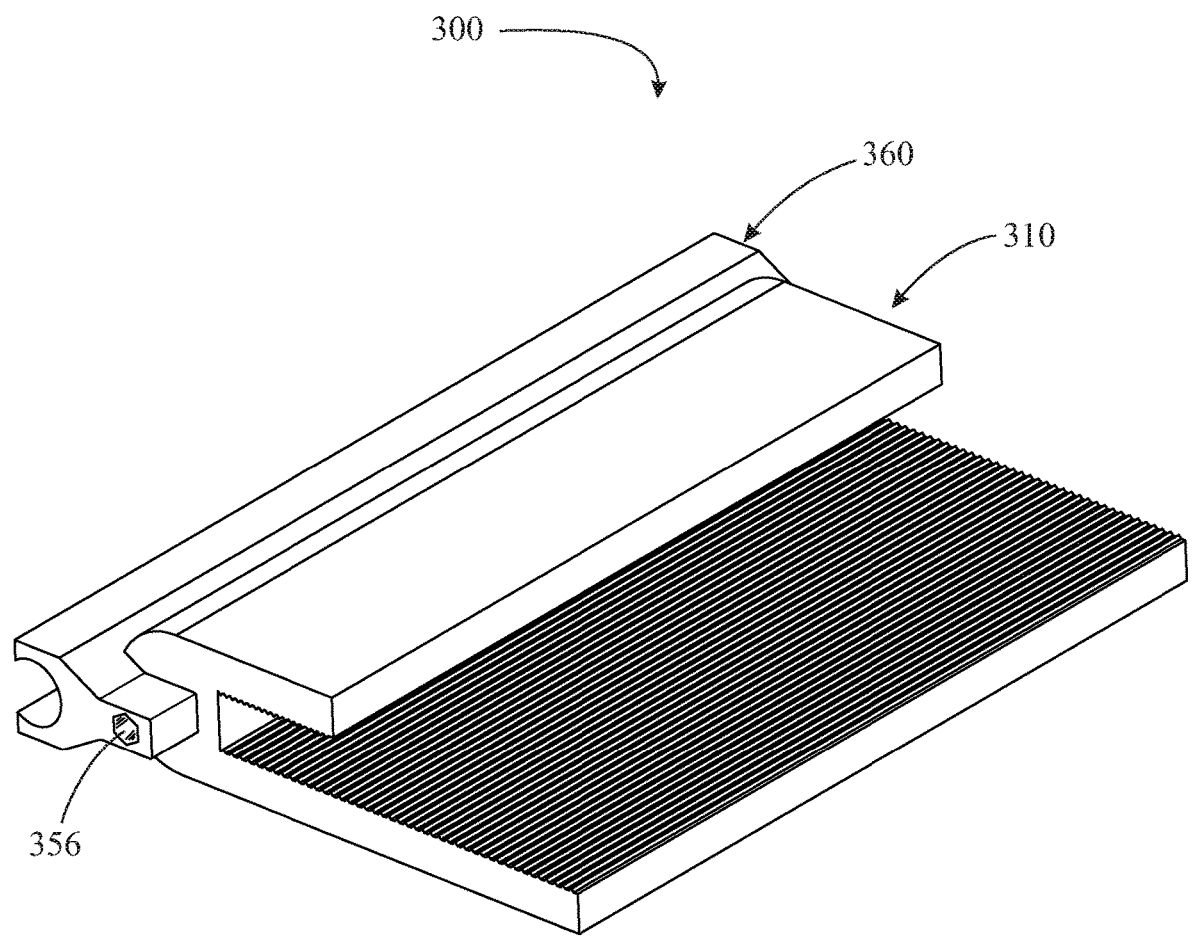
FIG. 5 is a perspective view of the two-piece apparatus of FIG. 4, shown in an assembled state.

As best depicted in FIG. 5, when finger-retaining component 360 is fully assembled to device engaging component 310, protrusions 354 fit snugly within apertures 364 of finger-retaining component tangs 363, such that protrusion flats 358 are directly aligned with and abut corresponding tang aperture flats 368. Due to the resilient, temporarily deformable composition of the protrusion, the edges separating adjacent flats 358 of protrusions 354 are able to temporarily deform when device-retaining component 310 is angularly rotated about finger-retaining component 360, until each series of flats are realigned with one another.

Figure 6:
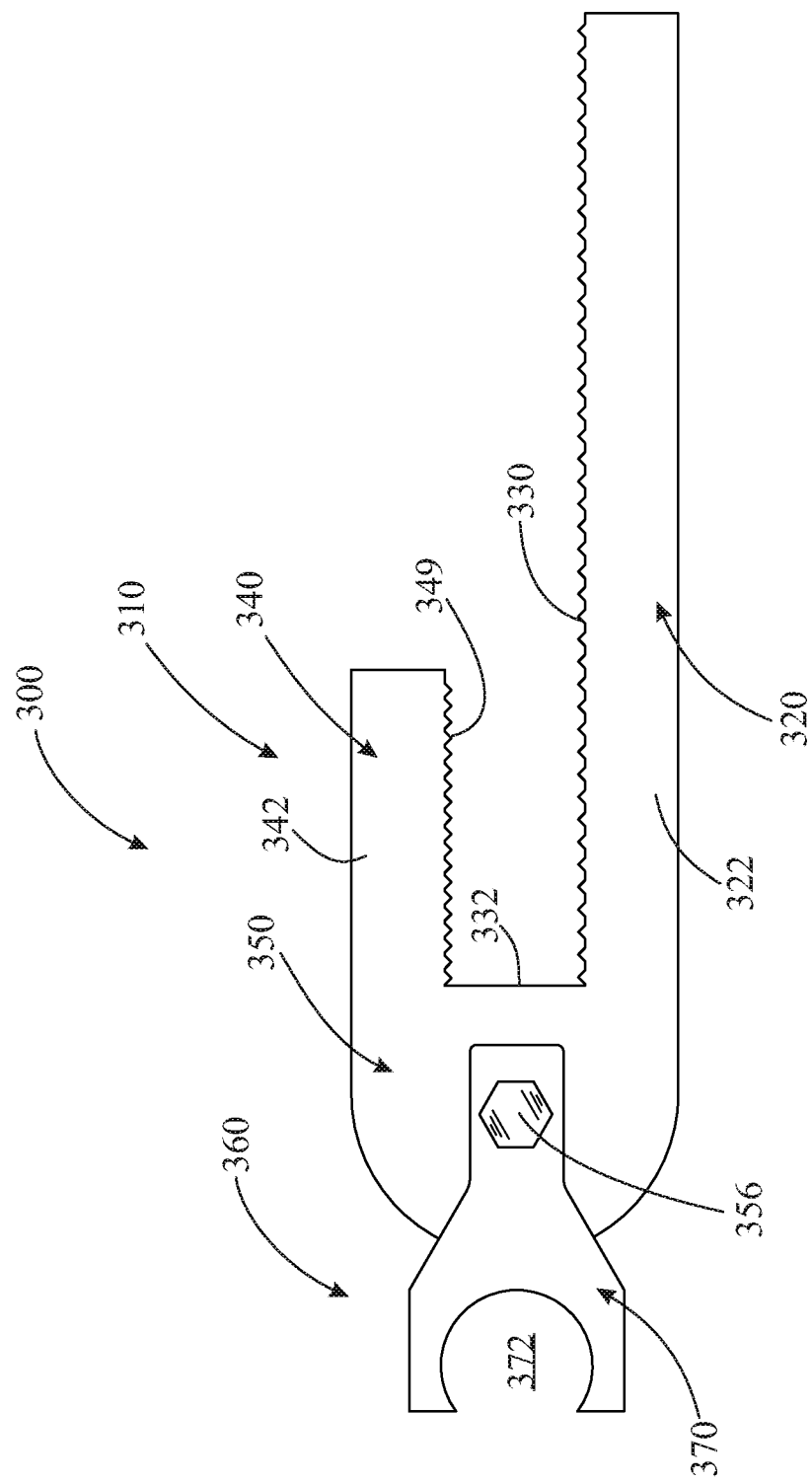
FIG. 6 is a side elevation view of the assembled apparatus shown in FIG. 5.
Figure 7:
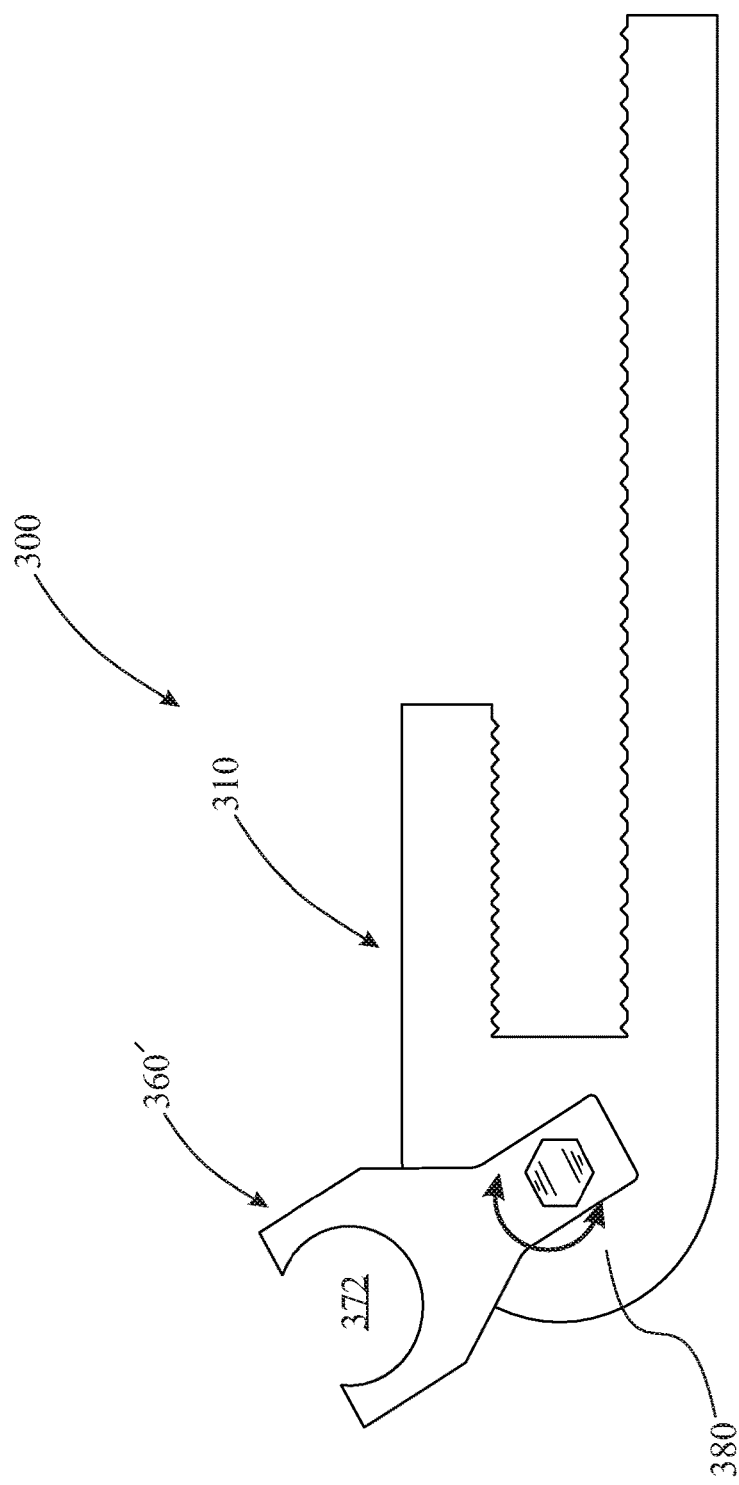
FIG. 7 is a side elevation view of the assembled apparatus shown in FIG. 5, illustrating the user-selectable angular rotation of finger engaging portion 360, angularly translated from an initial orientation 360 (as shown in FIG. 6) to a new user-selected orientation 360'.

Referring now particularly to FIGS. 6 and 7, angular adjustment of the mobile device-retaining component about the finger-retaining component will now be briefly described, with reference to the particular exemplary structure described hereinabove.

As shown in FIG. 6, device-retaining component 310 is shown angularly-offset 180-degrees from finger-retaining component 360. Obviously, during use a user's finger (e.g. the index finger of a user's left hand) would be inserted into finger-receiving channel 372 of finger-engaging portion 370 of finger-retaining component 360. As a result of the compression of the finger-receiving channel surface against the user's finger, due to the unique compressive construction previously described in great detail hereinabove with respect to the first implementation of the hand-supportable mobile device retaining apparatus 100 (in conjunction with the depictions in FIGS. 1, 3 and 8), the finger-engaging portion 370 is tightly engaged against the user's finger, preventing rotation of the channel 372 about the finger due to inadvertent slippage. Likewise, where the apparatus 300 is being used to secure a mobile device to an object (e.g. a vehicle sun visor) the unique construction also prevents such undesirable rotation.

Through application of a relatively nominal force a user of the apparatus 300 is able to rotate the finger-retaining component from a first position 360 (FIG. 6) to a second, angularly-offset, position 360' (FIG. 7) as desired. As will be apparent to those skilled in the art, the particular mechanism provided to illustrate the locking angular rotation functionality was merely an example of one such configuration enabling such functionality; however, the invention is not intended to be so limiting. Likewise, with regard to the particular locking angular rotation mechanism used to illustrate this functionality, it is contemplated that in lieu of having protrusions 354 extending outwardly from the mobile device-retaining component 310 cooperatively engaging corresponding apertures 364 extending through the tangs 363 of the finger-retaining component 360, protrusions 354 could have been provided extending inwardly from the tangs (i.e. in place of the apertures 364) for cooperatively engaging corresponding apertures/cavities extending into the inwardly into the proximal thickened end portions 350 in place of the protrusions 358.

Referring now generally to FIGS. 10-19, a handheld mobile device support apparatus 500, 700 is shown in accordance with a further embodiment of the present invention. Referring initially to FIGS. 10, 10A, 12, and 13-15, a handheld mobile device support apparatus 500 is shown in accordance with at some implementations of the present invention. Preferably, the apparatus 500 is provided having a unitary, or one-piece, molded structure including a support panel 502 and a universal finger-engaging cradle 520. Support panel 502 and finger-engaging cradle 520 are preferably molded from a relatively rigid polymer such as, for example, high-density polyethylene (HDPE), polypropylene (PP) and Polystyrene (PS), to name just a few.

Support panel 502 is generally defined by a front surface 504 and an opposite rear surface 506 separated by a contiguous perimeter (508, 510, 512, 514). The contiguous perimeter may include first and second lateral edges, 508 and 510, respectively, and upper and lower edges, 512 and 514, respectively. Upper edge 512 may be referred to herein by alternative terms, such as "top edge," "upper end," and "distal end" of support panel 502. Likewise, lower edge 514 may be referred to herein by alternative terms, such as "bottom edge," "lower end," and "proximal end" of support panel 502.

A tacky gel pad 516 (alternatively referred to herein as "gel pad layer" and "adhesion pad") is provided disposed upon an area of front surface 504 of support panel 502. Significantly, tacky gel pad layer 516 is formed from a material imparting a permanent tackiness, or permanent stickiness, to front exposed surface 517. In a preferred implementation, adhesion pad 516 is formed from a polyurethane gel composition. Unlike thermoplastic elastomers (TPE) or polyvinylchloride (PVC) based adhesion pad products, polyurethane gels do not have to contain processing oil, plasticizer, or other low-molecular-weight (liquid) materials, which could leach and dirty the contact surface; potentially, degrading the pad's adhesive characteristics. Acrylate and other polymers compounded with so-called tackifiers are other commonly used to create sticky, or tacky, surfaces; however, they are not preferred for use with the present invention because they do not impart a permanent tack to the exposed front surface 517 of the gel pad. To the contrary, the tackiness, or stickiness, associated with these materials continuously decreases with use. Thus, continually adhering, and then detaching, the rear side of a mobile phone housing to such a surface, even a few times, would significantly degrade the tackiness in short order. As should be apparent to those skilled in the relevant arts, non-polyurethane gel pad compositions could be employed, without departing from the intended scope of the present invention, as long as such alternative compositions impart the desired adhesive characteristics. That is, as long as the chosen composition provides a substantially permanent degree of adhesive force between the gel pad exposed surface 517 and the rear surface of the adhered mobile device when successively used over a period of time, such that the adhesive force is sufficient to prevent inadvertent detachment of the mobile device from the gel pad during use. For example, gel pad 516 may be formulated from silicone elastomers, or any other available chemical composition, imparting the required permanent adhesive force to the attached mobile device.

One example of a preferred polyurethane resin for forming gel pad 516 is GK-22 Polyurethane Gel manufactured by Tandem Products, Inc. d/b/a Northstar Polymers, LLC of Minneapolis, Minn. This polyurethane gel composition is a 2-part thermoset material. The molecular weight of the reaction products is controlled to yield a polymer film, which exhibits a state between highly viscous liquid and solid at room temperature. Significantly, this makes the polymer film permanently tacky without leaching out low-molecular-weight liquid. This is ideal material for pressure sensitive adhesive (PSA) applications such as the present application, where permanent tackiness without residue is important. The material may be cured at room temperature. With a simple casting process, it can be laminated and adhere permanently to high-surface-energy plastic films (not shown in the drawings) such that the laminated polyurethane gel can be cut to the desired shape, and attached to other plastic substrates (i.e. such as front surface 504 of front panel 502) using a glue or other chemical adhesive interposed between the plastic film and the front surface 504.

Accordingly, although not shown in the accompanying drawing figures, it will be understood to those skilled in the related arts that tacky gel pad 516 may have a structure that includes a relative thick layer of polyurethane gel, for example, disposed upon an underlying plastic film base. Accordingly, the plastic film base (not shown) of the tacky gel pad 516 may be easily directly adhered to front surface 504 of support panel 502 using a glue or other appropriate chemical adhesive. Most mobile smartphones have a weight within a range of about 4 ounces to 10 ounces. Therefore, it is preferable that the exposed surface 517 of gel pad 516 imparts an adhesive force to the rear surface 408 of a temporarily adhered mobile device 400 adequate to prevent the adhered mobile device from unsticking, or detaching, from the gel pad surface regardless of the orientation of the support panel 502. That is, the adhesive bond between the device 400 and the gel pad surface 517 should be sufficient to overcome the maximum downward force of the weight of the carried mobile device.

Figure 14:
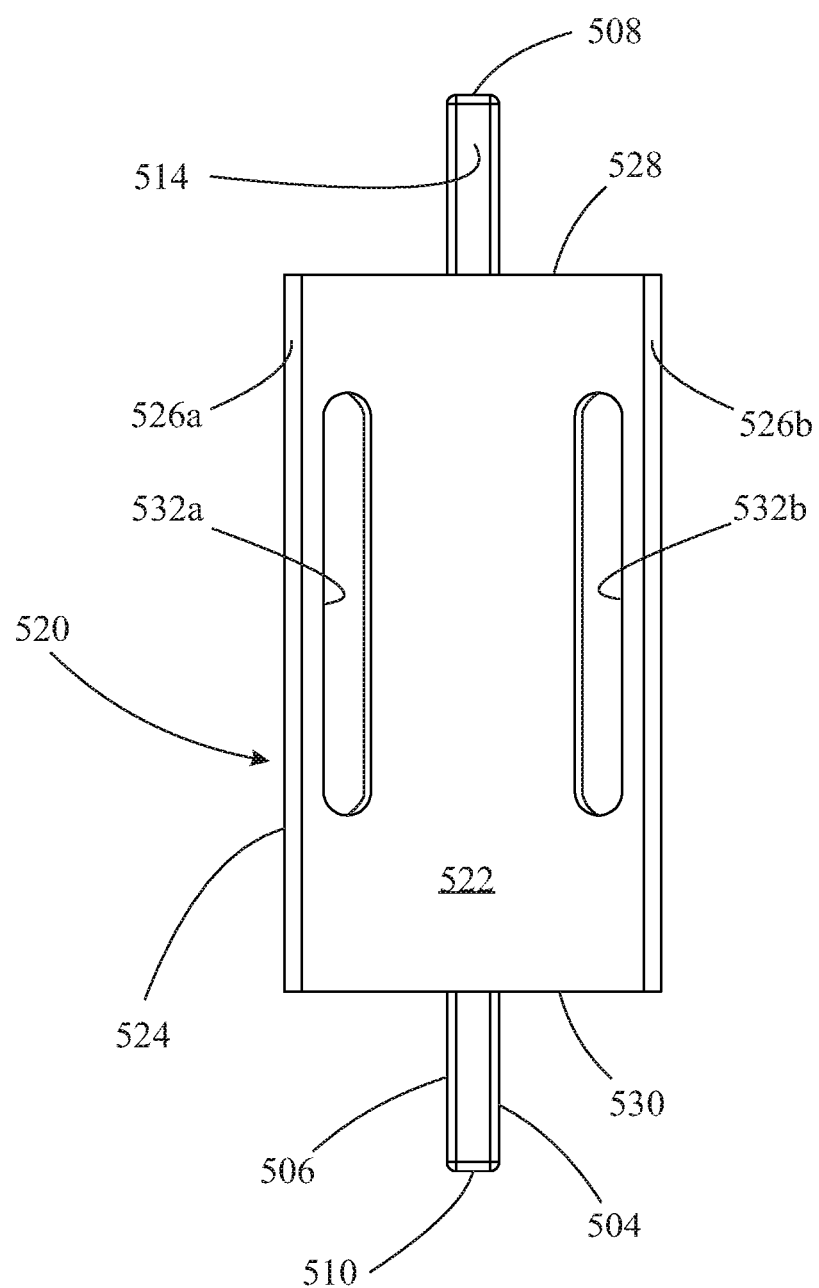
FIG. 14 is a bottom elevation view of the handheld mobile device support apparatus 500 originally introduced in FIG. 10.
Figure 15:
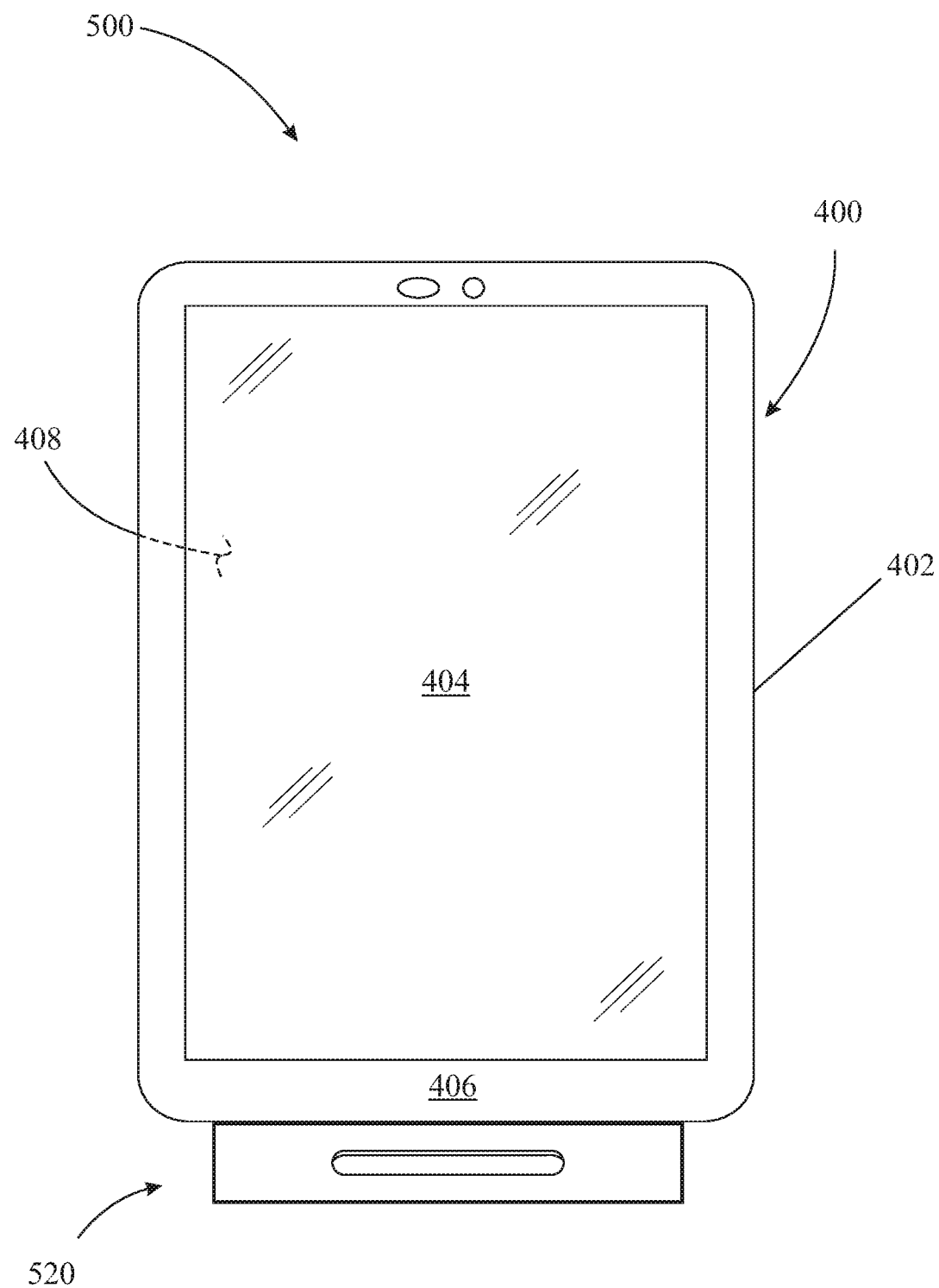
FIG. 15 is a front elevation view of the handheld mobile device support apparatus 500 of FIG. 13, shown with a mobile device 400 adhered to mobile device-supporting tacky gel pad 516.
Figure 16:
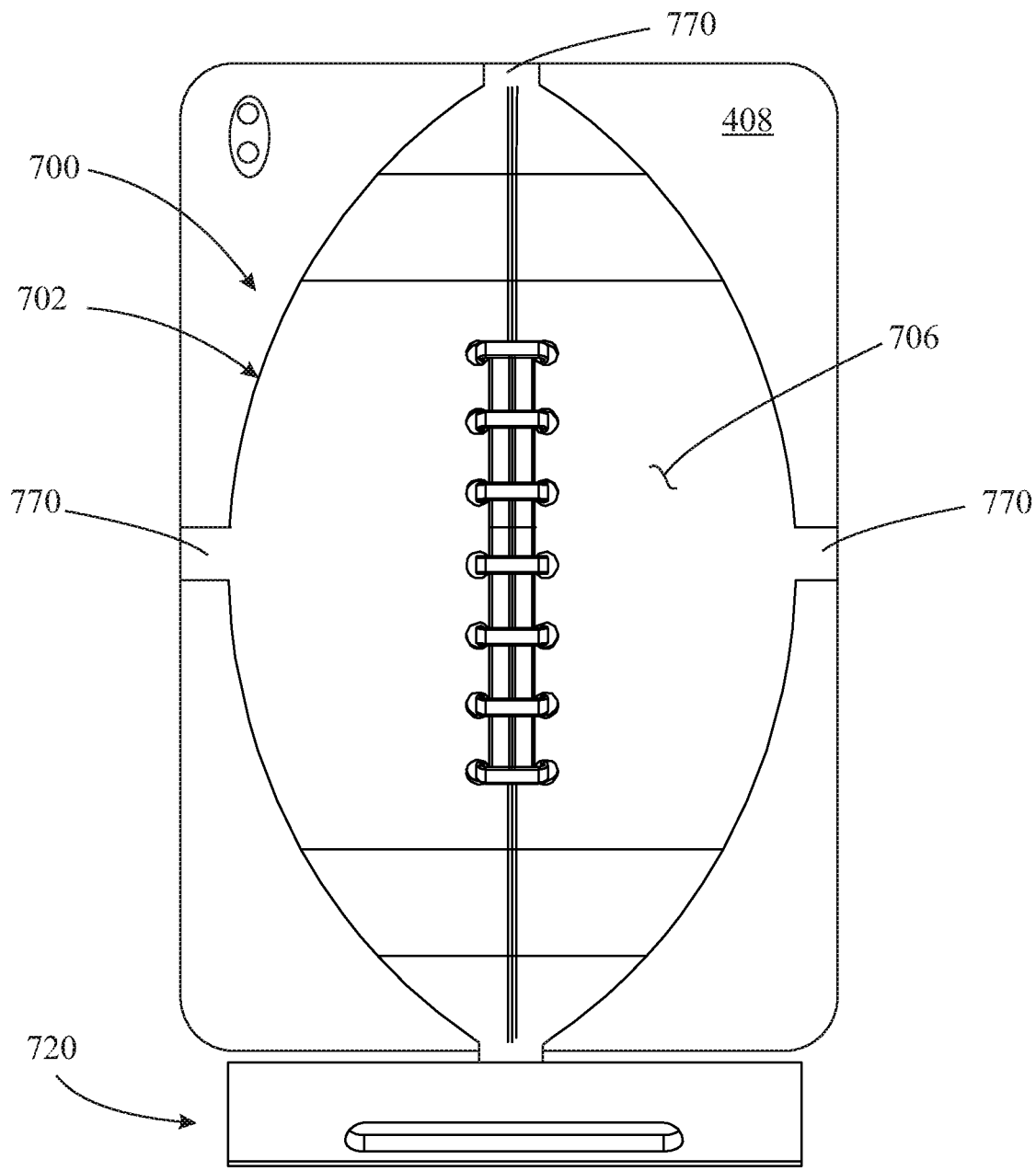
FIG. 16 is a rear elevation view of a handheld mobile device support apparatus 700 incorporating a football-shaped themed support panel 702, with mobile device 400 secured thereto.
Figure 17:
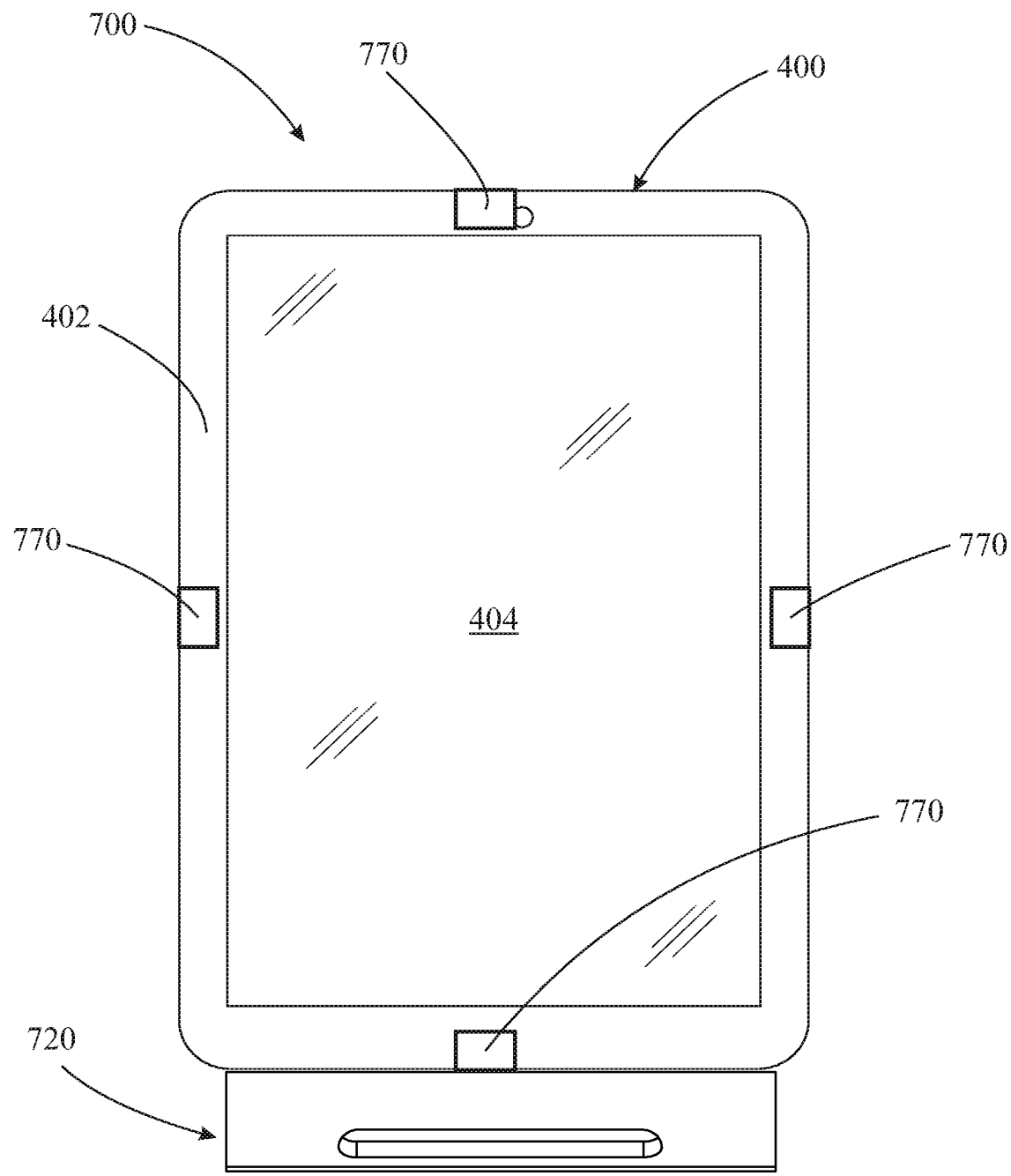
FIG. 17 is a front elevation view of the handheld mobile device support apparatus 700 shown in FIG. 16.
Figure 18:
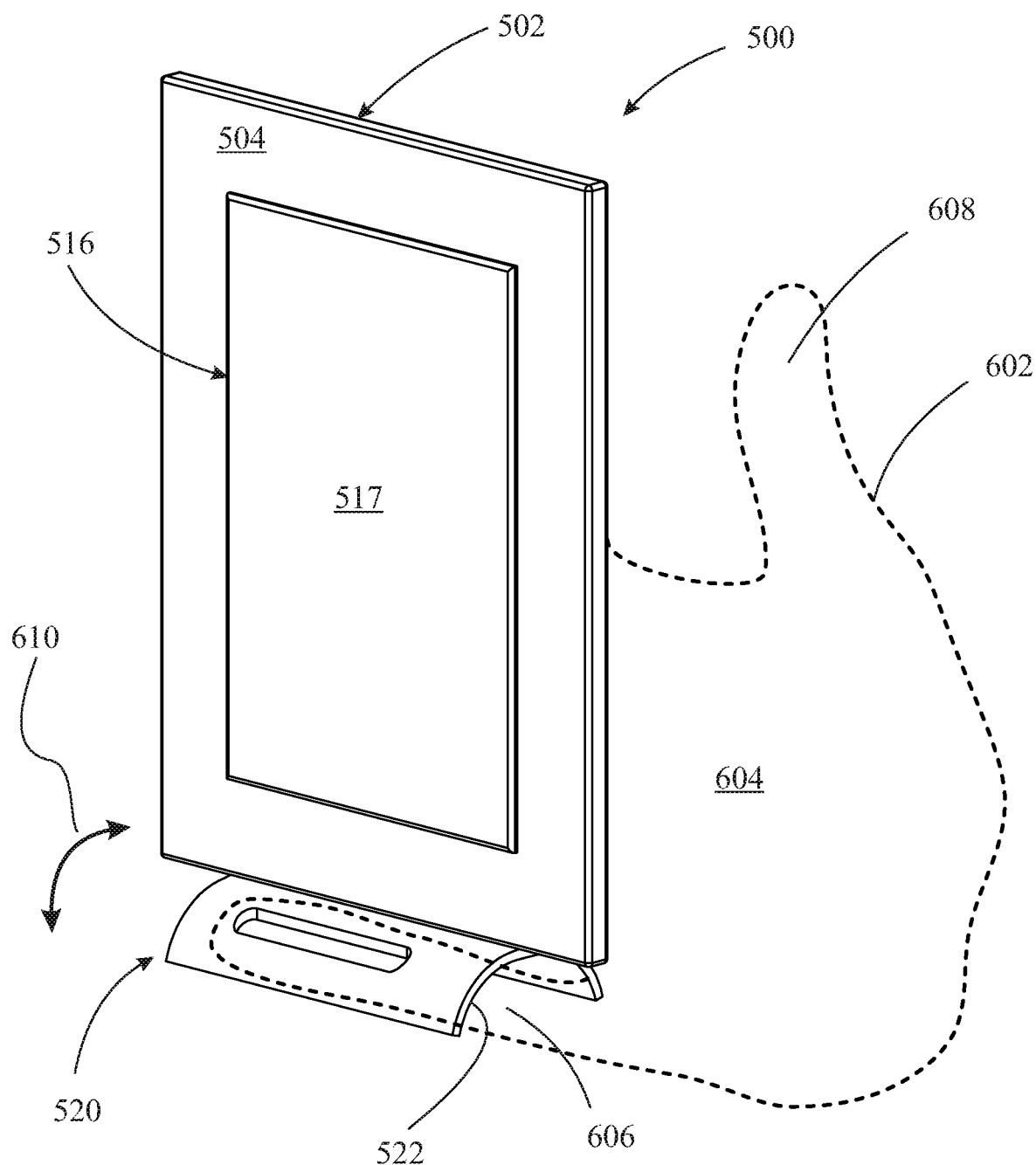
FIG. 18 is a right-front-top perspective view of the handheld mobile device support apparatus 500 of FIG. 10 depicted being held by the right hand (in phantom) of an individual with a pinky finger 606 shown engaging finger cradle 520 and the rear surface 506 of the mobile device support apparatus supported by the remaining fingers and palm 604 in an in-use state.

Briefly, as best shown in FIG. 14, finger-engaging cradle 520 may be in the form of a semi-cylindrical body having an interior, concave finger-engaging surface 522, and an opposite exterior, convex surface 524 adjoining the finger-engaging cradle 520 with the lower edge 514 of the support panel 502. The finger-engaging cradle 520 (alternatively referred to herein as a "finger-engaging cradle" and a "finger cradle") is further defined by a pair of forward and rearward lower edges, 526a and 526b, respectfully, and opposite first and second lateral edges, 528 and 530, respectively. For purposes further described herein, first and second strap-receiving lateral slots, 532a and 532b, respectively, are provided extending through the semi-cylindrical body of finger cradle 520.

Figure 11:
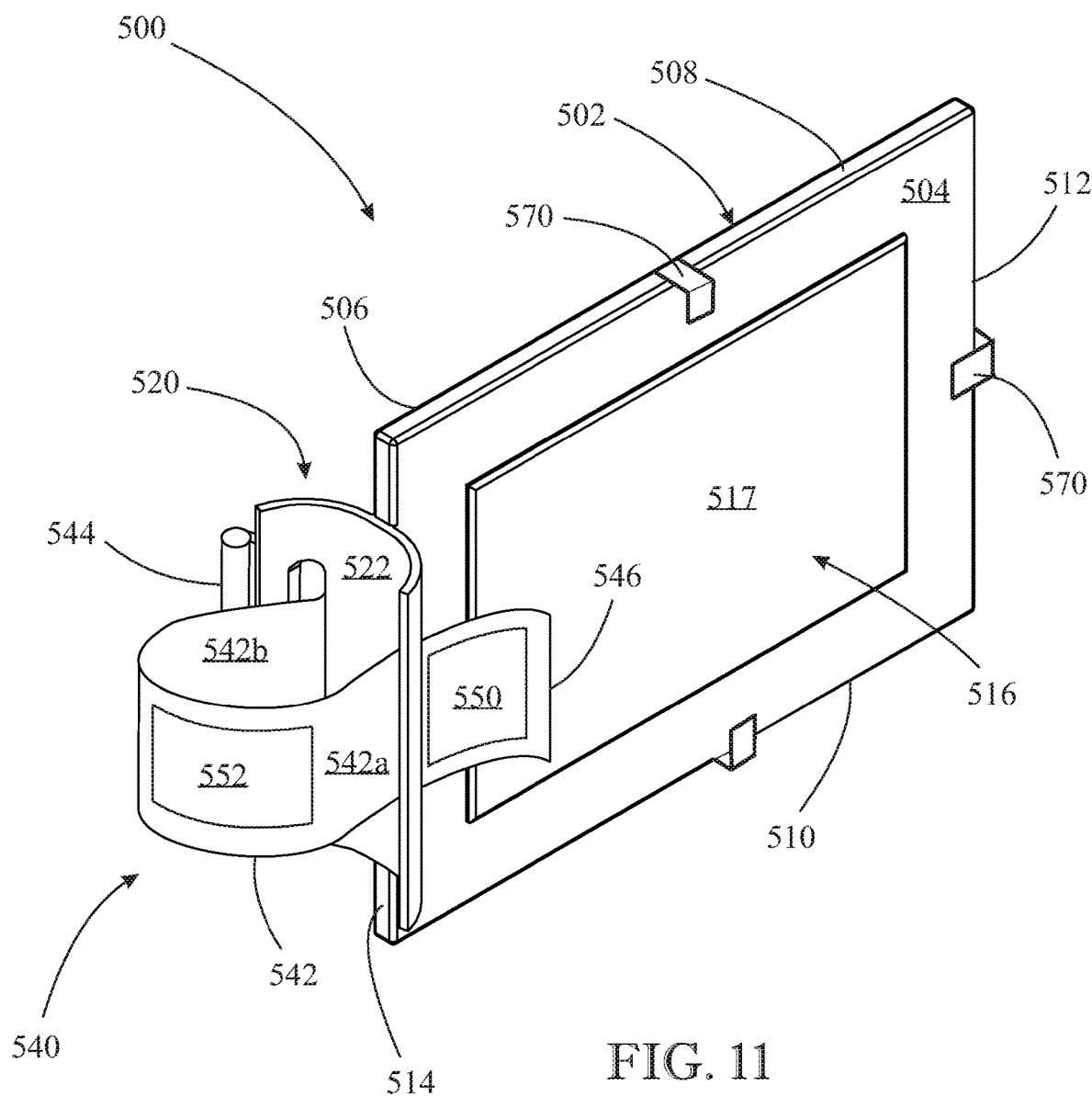
FIG. 11 is a front-left-upper perspective view of the handheld mobile support apparatus 500 introduced in FIG. 10, show with an adjustable finger-retaining strap 540 for tightly securing a user's finger against finger cradle 520, and a plurality of spaced-apart complementary mobile device support clips 570 along the perimeter of support panel 502.
Figure 12:
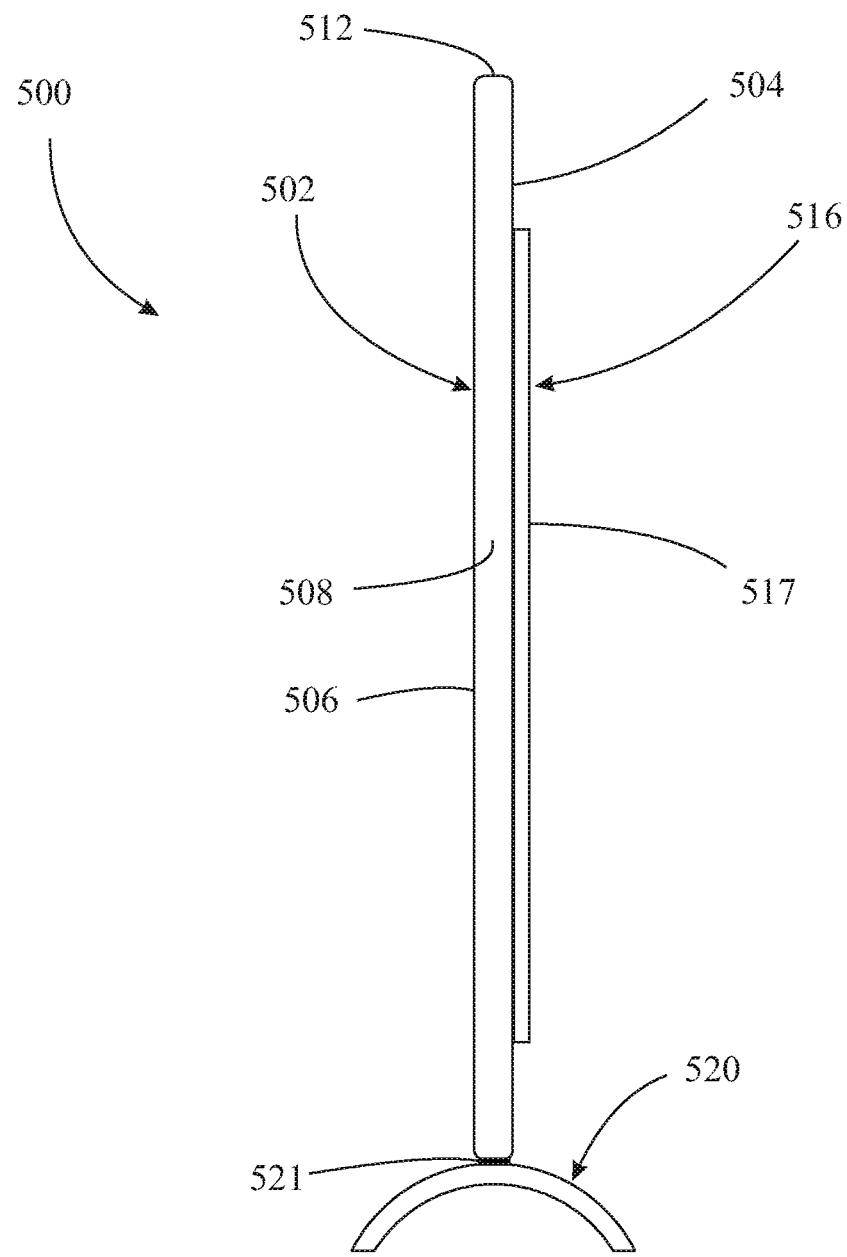
FIG. 12 is a left side elevation view of the handheld mobile device support apparatus 500 originally introduced in FIG. 10.
Figure 13:
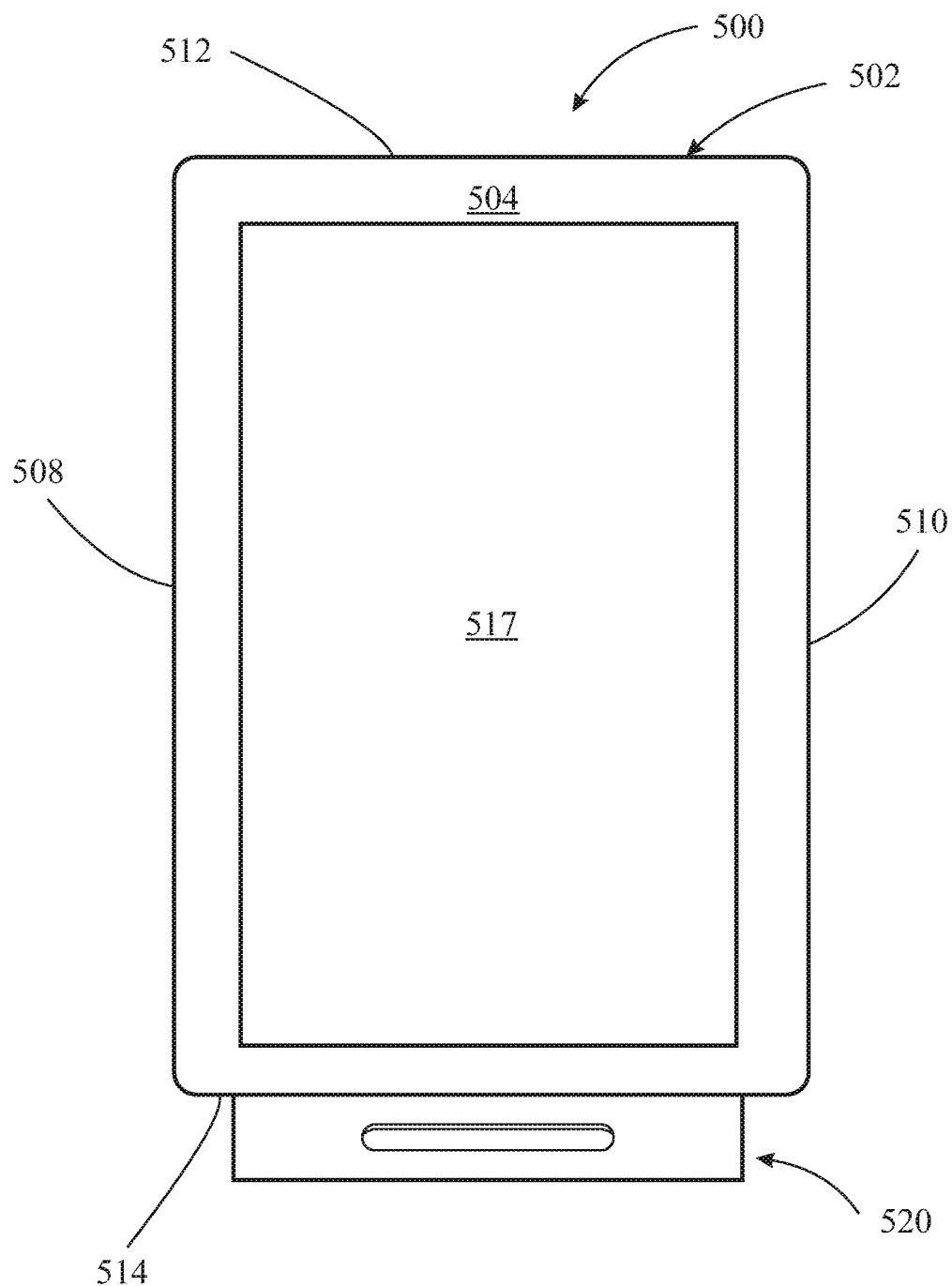
FIG. 13 is a front elevation view of the handheld mobile device support apparatus 500 originally introduced in FIG. 10.

Referring now primarily to FIG. 11, an adjustable finger retention strap length 540 is preferably provided for maintaining a tight engagement of a user's finger against concave finger contact surface 522 of finger cradle 520 during use. The strap length 540 may be constructed from a non-stretchable, non-resilient flexible material such as Nylon. Alternatively, the strap length 540 may be constructed from a stretchable, resilient flexible material such as rubber, silicone, and the like.

Strap length 540 may include a thickened strap end 544 and an opposite free end 546. Furthermore, an exterior surface 542a of strap length 540 may have disposed thereon a first half 550 of a hook-and-loop attachment system proximate to the free end 546 of strap, and a second half 552 of the hook-and-loop attachment system spaced inwardly from the first half 550, toward an intermediate strap length location. During attachment of the apparatus 500 to a user's finger 606 (see FIG. 18) free strap end 546 may be fed through first strap-receiving slot 526a of finger support cradle 520, around the user's finger, and through second strap-receiving slot 526b, to form a strap loop 542. Subsequently, the free strap end 546 may be pulled taut and folded back upon itself, or tightened, to firmly sandwich the user's finger between interior strap surface 542b and concave finger contact surface 522 of finger cradle 520. The thickened strap end 544 is provided having a thickness greater than the width of first strap-receiving slot 526a to prevent the thickened strap end from being inadvertently pulled therethrough. Finally, the first half 550 of the hook-and-loop system may be releasably secured to the respective second half 552 of the hook-and-loop system to tightly secure the apparatus 500 to a user's finger, such that the apparatus 500 and carried mobile device 400 are secured and the user can selectively rotate the apparatus (and attached mobile device) about the central axis of the user's finger, between a non-use position/orientation, wherein the user's hands are kept free for other uses, and an in-use position/orientation, wherein the mobile device is oriented to enable the user to interact via the user's thumbs with the mobile device touchscreen display.

Furthermore, support panel 502 may incorporate a plurality of auxiliary mobile device support clips 570 for complementing, or augmenting, the adhesive support rendered by gel pad 516 to mobile device 400. Preferably, the mobile device support clips 570 are integral with support panel 502. That is, it is preferred that the support clips 570 are provided as molded features of the apparatus 500. As will be apparent to those skilled in the art, while not preferred, the support clips 570 may optionally be provided as separate components attached about the periphery of the support panel 502. Furthermore, although the support clips 570 are shown located at particular positions about the support panel periphery any number of clips may be provided at any corresponding peripheral locations desired. Likewise, in addition to clips 570, or in lieu thereof, corner ears (not shown) defining receiving slots may be integrated overhanging corner portions of support panel front surface 504 for seating corners of a corresponding portable mobile device therein.

Figure 19:
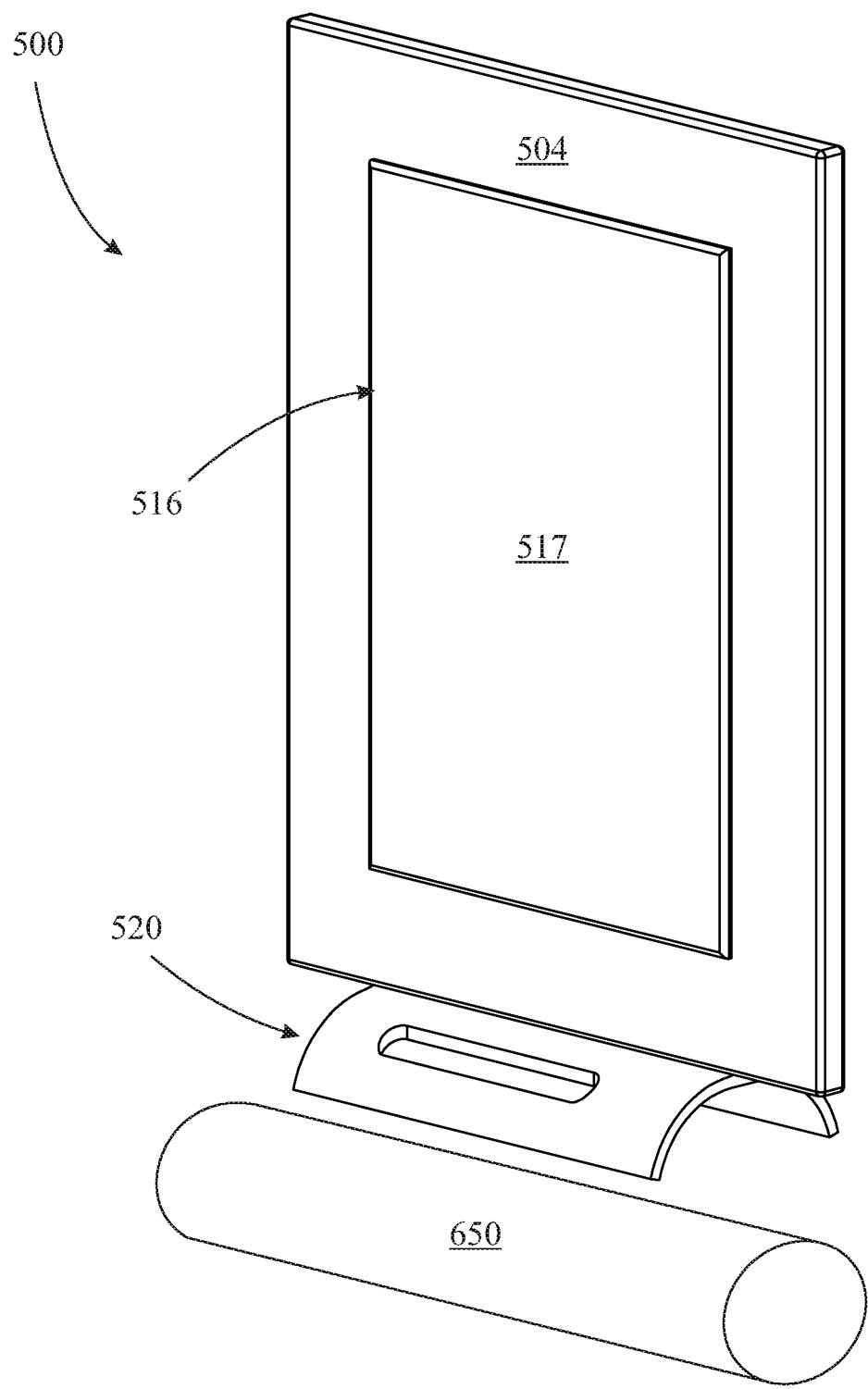
FIG. 19 is a front-right-top perspective view of the mobile device support apparatus 500 introduced in FIG. 10, illustrating an alternative application wherein the apparatus is oriented for attachment to a cylindrical apparatus support structure (i.e. in lieu of an individual's finger).

Referring now particularly to FIG. 19, finger-supporting cradle 520 (shown with adjustable finger retention strap length 540 removed for convenience) may be used for auxiliary applications, such as attaching the apparatus 500 to a structural surface, such as cylindrical support member 650. For instance, the finger support cradle 520 may be employed (in conjunction with adjustable finger retention strap length 540) to temporarily fasten the apparatus to handlebars of a bicycle, a vehicle steering wheel, or any other cylindrical structure.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A finger-supportable apparatus for releasably retaining a portable mobile device during use, the finger-supportable apparatus comprising:

a mobile device retention portion comprising a planar support panel having a contiguous perimeter edge separating a front surface and an opposite rear surface, and a gel pad layer disposed upon the front surface of the planar support panel, the gel pad having a permanently tacky exposed planar front surface, wherein the tackiness of the exposed planar front surface of the gel pad creates an adhesive force, between the planar front surface of the gel pad and a planar rear surface of a supported mobile device, sufficient to maintain adhesion of the rear surface of the mobile device to the front surface of the gel pad regardless of the orientation of the finger-supportable apparatus, the contiguous perimeter edge of the support panel extending beyond an upper side, a lower side, and a pair of lateral sides of a corresponding perimeter of the portable mobile device during use; and a finger-receiving portion in the form of a semi-cylindrical shell body defining a concave interior surface and an opposite convex exterior surface, a linear peak of said convex exterior surface aligned with a central plane of the support panel, the mobile device retention portion and the finger-receiving portion comprising a unitary structure, wherein, the unitary structure precludes positional translation of the mobile device retention portion and the finger-receiving portion with respect to one another.

2. The finger-supportable apparatus recited in claim 1, wherein the finger-receiving portion defines a finger-receiving channel having a central axis parallel to a plane of the mobile device retention portion.

3. The finger-supportable apparatus recited in claim 2, wherein the finger-receiving portion further comprises a finger-receiving cradle adjoined to a proximal, lower end of the mobile device retention portion in a manner precluding any positional displacement of the finger-receiving cradle vis-à-vis the mobile device retention portion.

4. The finger-supportable apparatus recited in claim 3, wherein the finger-receiving cradle further comprises:
- a unitary semi-cylindrical body defining a concave interior surface and an opposite convex exterior surface, the unitary semi-cylindrical body having a pair of strap-receiving slots provided therethrough and each having a longitudinal axis parallel to the central axis of the finger-receiving cradle channel.

5. The finger-supportable apparatus recited in claim 4, further comprising:
- a strap having a strap length extending between a fixed strap end and a free strap end, the fixed strap end having an adequate thickness to prevent the fixed strap end from being pulled through either of the pair of strap-receiving slots of the finger-receiving cradle.

6. The finger-supportable apparatus recited in claim 5, the strap further comprising:
- a first half of a hook-and-loop system disposed upon an exterior strap surface proximate to the free strap end, and
- a second half of a hook-and-loop system disposed upon the exterior strap surface a distance from the first half of the hook-and-loop system, wherein, the free end of the strap length may be threaded through a first one of the pair of strap-receiving slots, around a finger seated within the finger cradle, through a second one of the pair of strap-receiving slots, and subsequently folded back on itself, tightened, and secured via the first and second halves of the hook-and-loop system to tightly secure the finger within the finger-receiving cradle channel.

7. The finger-supportable apparatus recited in claim 1, wherein the support panel further comprises:
- a plurality of spaced-apart mobile device support clips located about the contiguous perimeter edge of the support panel, wherein the support clips are configured to engage a perimeter portion of a supported mobile device to complement support provided by the adhesive force between the gel pad front surface and the rear surface of the supported mobile device.

8. The finger-supportable apparatus recited in claim 1, wherein the gel pad further comprises a polyurethane gel.

9. The finger-supportable apparatus recited in claim 7, wherein the gel pad further comprises a polyurethane gel.

* * * * *